US012705708B2

(12) United States Patent
Habibian et al.

(10) Patent No.: US 12,705,708 B2
(45) Date of Patent: Aug. 11, 2026

(54) EFFICIENT DIFFUSION MACHINE LEARNING MODELS

(71) Applicant: QUALCOMM Incorporated, San Diego, CA (US)

(72) Inventors: Amirhossein Habibian, Amsterdam (NL); Risheek Garrepalli, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 18/488,786

(22) Filed: Oct. 17, 2023

(65) Prior Publication Data

US 2025/0124551 A1 Apr. 17, 2025

(51) Int. Cl.
*G06T 5/70* (2024.01)

(52) U.S. Cl.
CPC ...... *G06T 5/70* (2024.01); *G06T 2207/20016* (2013.01); *G06T 2207/20081* (2013.01)

(58) Field of Classification Search
CPC ............. G06T 5/70; G06T 2207/20016; G06T 2207/20081; G06N 3/044; G06N 3/0455; G06N 3/0464; G06N 3/0475; G06N 3/084; G06N 5/01; G06N 3/096
See application file for complete search history.

(56) References Cited

U.S. PATENT DOCUMENTS

| | | | | |
|---|---|---|---|---|
| 11,908,180 | B1 * | 2/2024 | Ho | G06V 10/82 |
| 2023/0043310 | A1 * | 2/2023 | Yang | G06N 3/09 |
| 2023/0067841 | A1 * | 3/2023 | Saharia | G06N 3/047 |
| 2023/0245354 | A1 * | 8/2023 | Hamilton | G06V 10/776 382/131 |
| 2023/0353764 | A1 * | 11/2023 | Ikonin | G06N 3/0464 |
| 2023/0377226 | A1 * | 11/2023 | Saharia | G06N 3/08 |
| 2024/0256831 | A1 * | 8/2024 | Li | G06N 3/045 |
| 2024/0266004 | A1 * | 8/2024 | Van Den Berg | G06N 3/045 |
| 2024/0394933 | A1 * | 11/2024 | Chemerys | G06N 3/084 |
| 2024/0412430 | A1 * | 12/2024 | Geng | G06T 5/70 |
| 2025/0029212 | A1 * | 1/2025 | Bai | G06T 5/60 |
| 2025/0029289 | A1 * | 1/2025 | Bai | G06T 11/00 |
| 2025/0061701 | A1 * | 2/2025 | Zhao | G06V 10/806 |
| 2025/0069203 | A1 * | 2/2025 | Zhou | G06T 11/60 |

(Continued)

OTHER PUBLICATIONS

Koutnik J., et al., "A Clockwork RNN", arXiv:1402.3511v1 [cs.NE], Feb. 14, 2014, 9 Pages.

(Continued)

*Primary Examiner* — Xuemei G Chen
(74) *Attorney, Agent, or Firm* — Patterson & Sheridan LLP

(57) ABSTRACT

Certain aspects of the present disclosure provide techniques and apparatus for improved machine learning. During a first iteration of processing data using a first denoising backbone of a teacher diffusion machine learning model, a first latent tensor is generated using a lower resolution block of the first denoising backbone. During a first iteration of processing data using a second denoising backbone of a student diffusion machine learning model, a second latent tensor is generated using an adapter block of the second denoising backbone. A loss is generated based on the first and second latent tensors, and one or more parameters of the adapter block are updated based on the loss.

10 Claims, 11 Drawing Sheets

(56) References Cited

U.S. PATENT DOCUMENTS

| | | | | |
|---|---|---|---|---|
| 2025/0069373 | A1* | 2/2025 | Vecchio | G06T 5/77 |
| 2025/0078546 | A1* | 3/2025 | Zhang | G06V 10/82 |
| 2025/0086843 | A1* | 3/2025 | Zafar | G06N 3/0464 |
| 2025/0095114 | A1* | 3/2025 | Ravi | G06T 5/50 |
| 2025/0095338 | A1* | 3/2025 | Li | G06V 10/774 |
| 2025/0117995 | A1* | 4/2025 | Li | G06T 7/50 |
| 2025/0124301 | A1 | 4/2025 | Habibian et al. | |
| 2025/0284926 | A1* | 9/2025 | Luo | G06N 3/042 |

OTHER PUBLICATIONS

Rombach R., et al., "High-Resolution Image Synthesis with Latent Diffusion Models", arXiv:2112.10752v2 [cs.CV], Apr. 13, 2022, pp. 1-45.

Salimans T., et al., "Progressive Distillation for Fast Sampling of Diffusion Models", Published as a conference paper at ICLR 2022, arXiv:2202.00512v2 [cs.LG], Jun. 7, 2022, pp. 1-21.

Chai S, et al., "LayoutDM: Transformer-based Diffusion Model for Layout Generation", 2023 IEEE/CVF Conference on Computer Vision And Pattern Recognition (CVPR), Jun. 17, 2023, pp. 18349-18358, XP034402645, abstract, sections 1, 3, 4.

Habibian A., et al., "Clockwork Diffusion: Efficient Generation With Model-Step Distillation", 2024 IEEE/CVF Conference on Computer Vision and Pattern Recognition (CVPR), Dec. 13, 2023, pp. 8352-8361, XP093225641, pp. 1-23, The Whole Document.

International Search Report and Written Opinion—PCT/US2024/044905—ISA/EPO—Dec. 4, 2024.

Jang W., et al., "FastFit: Towards Real-Time Iterative Neural Vocoder by Replacing U-Net Encoder With Multiple STFTs", arxiv.org, Cornell University Library, 201 Olin Library Cornell University Ithaca, NY 14853, May 18, 2023, XP091511752, 5 Pages, abstract, sections 1, 3, 4.

Li Y., et al., "SnapFusion: Text-to-Image Diffusion Model on Mobile Devices within Two Seconds", arXiv:2306.00980v3, Arxiv. Org, Cornell University Library, 201 Olin Library Cornell University Ithaca, NY 14853, Oct. 16, 2023, 17 Pages, XP091635157, abstract sections 1, 3, 4.

Meng C., et al., "On Distillation of Guided Diffusion Models", arXiv: 2210.03142v2 [cs.CV], Arxiv.Org, Cornell University Library, 201 Olin Library Cornell University Ithaca, NY 14853, Nov. 30, 2022, 34 Pages, XP091380591, abstract sections 1, 3.1, 3.2, 3.3.

Peebles W., et al., "Scalable Diffusion Models with Transformers", 2023 IEEE/CVF International Conference on Computer Vision (ICCV), Oct. 1, 2023, pp. 4172-4182, XP034514857, abstract, sections 1, 3, 5.

Rombach R., et al., "High-Resolution Image Synthesis with Latent Diffusion Models", arxiv.org, Cornell University Library, 201 Olin Library Cornell University Ithaca, NY 14853, Dec. 20, 2021, XP091118987, pp. 1-45, abstract, sections 1, 3, 4.

* cited by examiner

Access teacher model 505

Access training data 510

Generate latent tensor(s) from teacher model 515

Generate latent tensor(s) from student model 520

Compute latent tensor loss(es) 525

Additional iteration(s)? 530

Yes

No

Update student model parameters 535

Termination criteria met? 540

No

Yes

Deploy student model 545

900
914
902 CPU
912 Wireless Connectivity
904 GPU
916 Sensor(s)
906 DSP
918 ISPs
908 NPU
920 Navigation
910 Multimedia
922 Input/Output
924 MEMORY
924A Higher Resolution Component
924C Adapter Component
924B Lower Resolution Component
924D Processing Component
924E Model Parameter(s)
926 Higher Resolution Circuit
928 Adapter Circuit
927 Lower Resolution Circuit
929 Processing Circuit

EFFICIENT DIFFUSION MACHINE LEARNING MODELS

INTRODUCTION

Aspects of the present disclosure relate to machine learning.

A wide variety of machine learning architectures have recently been used to perform innumerable tasks with high accuracy and reliability. As one example, generative models have recently been used to generate image and/or video output based on textual and other inputs. For example, models have been trained to provide text-based image and/or video content generation, text-based image and/or video content editing, image and/or video enhancements (e.g., super-resolution, colorization, and the like), image and/or video compression, and the like.

A variety of generative model architectures have been used. However, generative models, such as diffusion-based models, are generally computationally expensive. In addition to high training costs, many generative models (such as diffusion models) rely on an iterative inferencing or generation process (e.g., re-processing feature maps multiple times) to generate output. For example, diffusion models (also referred to as reverse-diffusion models in some aspects) generally use a reverse diffusion step that involves executing a computationally expensive denoising function. This step is often performed dozens of times to generate a single output image. In these ways, some conventional generative models consume substantial computational resources while resulting in substantial latency to generate a single prediction.

BRIEF SUMMARY

Certain aspects of the present disclosure provide a processor-implemented method, comprising: generating, during a first iteration of processing data using a denoising backbone of a diffusion machine learning model, a first latent tensor using a lower resolution block of the denoising backbone; generating, during the first iteration, a first feature tensor based on processing the first latent tensor using a higher resolution block of the denoising backbone, the higher resolution block using a higher resolution than the lower resolution block; generating a second latent tensor based on processing the first latent tensor using an adapter block of the denoising backbone; and generating, during a second iteration of processing the data using the denoising backbone, a second feature tensor based on processing the second latent tensor using the higher resolution block.

Certain aspects of the present disclosure provide a processor-implemented method, comprising: generating, during a first iteration of processing data using a first denoising backbone of a teacher diffusion machine learning model, a first latent tensor using a lower resolution block of the first denoising backbone; generating, during a first iteration of processing data using a second denoising backbone of a student diffusion machine learning model, a second latent tensor using an adapter block of the second denoising backbone; generating a loss based on the first and second latent tensors; and updating one or more parameters of the adapter block based on the loss.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
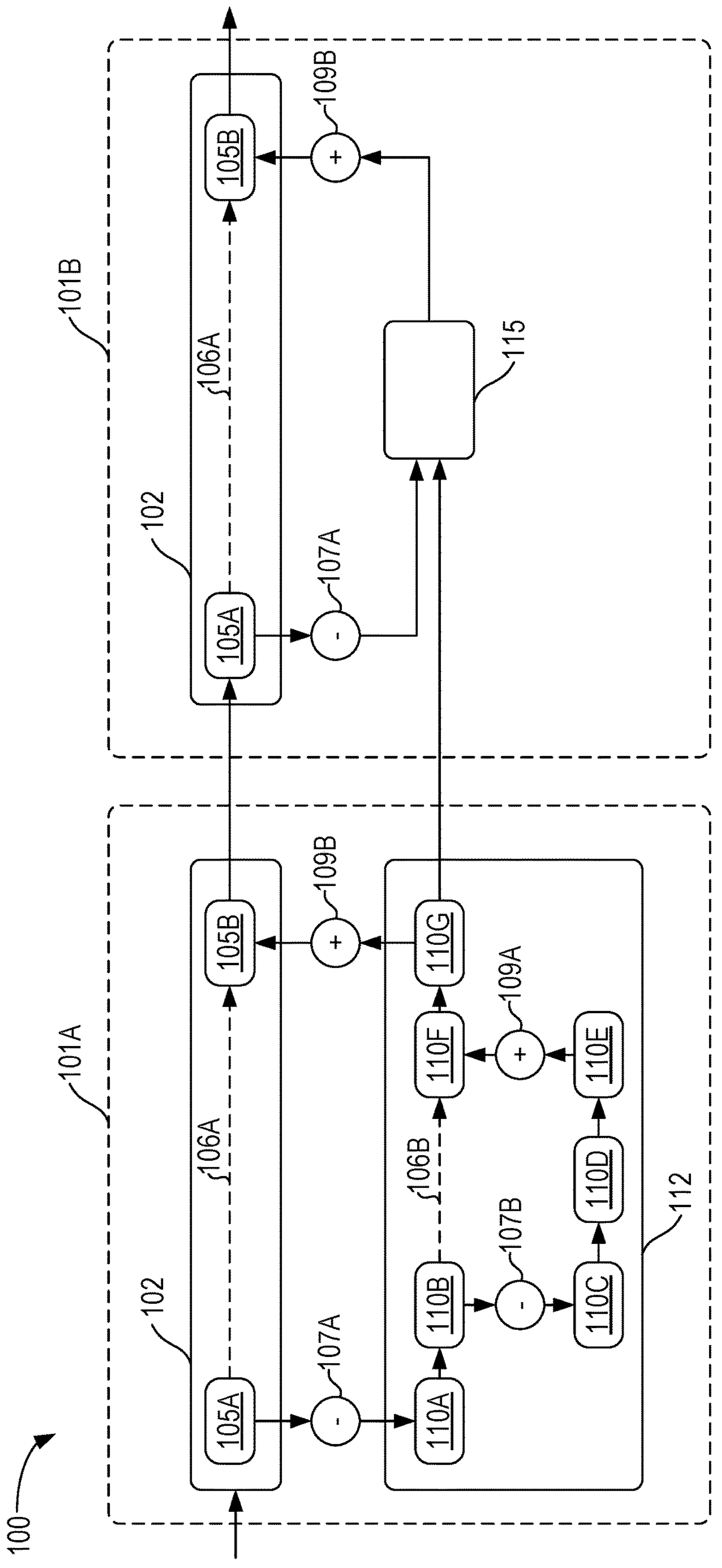
FIG. 1 depicts an example workflow for efficient generative machine learning models, according to some aspects of the present disclosure.

Aspects of the present disclosure provide apparatuses, methods, processing systems, and non-transitory computer-readable mediums for providing improved generative machine learning.

Processing data using diffusion machine learning models generally involves iteratively applying a noise-prediction function to denoise a noisy sample into a denoised sample, starting from noise (e.g., a white Gaussian noise at time or iteration t=T) and moving towards the final generation (e.g., an output image) at time or iteration t=0. As used herein, a "time" or "time step" may generally refer to an iteration of processing data using the model. For example, processing data for T iterations may be referred to as processing the data at T time steps. In some aspects, the noise prediction function can be decomposed into low-resolution (or lower-resolution) and high-resolution (or higher-resolution) denoising functions, as discussed below in more detail.

The low-resolution denoiser generally receives a low-resolution latent representation and predicts a denoised latent tensor. Generally, the denoising (referred to in some aspects as reverse diffusion) is performed in a latent space to reduce computational complexity, as the higher-resolution image space may be too large to reasonably operate in. In some aspects, the generation process begins with a white noise image and iteratively removes noise to generate the output image. At each iteration, given the denoised latent tensor and a noisy input feature, the high-resolution denoiser predicts a denoised output. This process can then be repeated for a desired number of iterations.

In some conventional architectures, both the lower and higher resolution operations are performed for each iteration (also referred to as a sampling step) from t=T to t=0. Note that in some aspects, by convention, t is decremented (rather than incremented) each iteration. This is because the denoising process reverses the diffusion process, and the decrementing approach allows identification of corresponding stages or iterations in both the forward and reverse paths using the same notation. In some aspects, however, relative stability of low-resolution latent tensors across sampling steps can be leveraged to reduce the computational cost and latency incurred by generation of the latent tensors. More specifically, in some aspects, the lower resolution block of model may be used only for a subset of the iterations or sampling steps. During other iterations, an efficient approximation can be used to generate the latent tensor(s).

In some aspects, the denoised latent tensor(s) in at least some iterations are approximated using an adapter function or block, discussed in more detail below. In some aspects, the adapter is implemented as a shallow convolutional network without computationally expensive operations such as self-attention or cross-attention. In some aspects, during the sampling process (e.g., during inferencing), the latent tensors can be generated (also referred to as denoised) by switching between the lower resolution computational blocks and the relatively more efficient adapter based on various criteria, such as a defined clock scheduling (also referred to as intermittent or periodic scheduling). For example, the efficient adapter may be used every other iteration, or for multiple iterations before using the lower resolution block again.

In this way, the adapter (which generally consumes fewer computational resources and/or incurs reduced latency, as compared to the conventional lower resolution operations) can be used to substantially reduce the latency and computational expense of generating model output during inferencing. In further aspects, a variety of other inputs and/or skip connections can be used in conjunction with the adapter block to produce more accurate or desirable model outcomes using relatively fewer iterations, as compared to some conventional systems.

Example Workflow for Efficient Generative Machine Learning Models

FIG. 1 depicts an example workflow 100 for efficient generative machine learning models, according to some aspects of the present disclosure. In some aspects, the workflow 100 is performed by a machine learning system, such as a computing system that trains and/or uses diffusion models during inferencing.

The illustrated example depicts two iterations 101A and 101B (collectively, the iterations 101) of processing data using a diffusion machine learning model. Specifically, the iterations 101A and 101B depict processing data during two consecutive iterations of a denoising backbone of a diffusion machine learning model. As used herein, a "denoising backbone" generally refers to the components of a generative model that perform the iterative denoising operations used to generate output images. As discussed above, in some aspects, each iteration 101 comprises use of a lower resolution (which may also be referred to as a first resolution) operation to produce a latent tensor for the iteration 101, as well as a higher resolution (which may also be referred to as a second resolution) operation to generate a set of output features, based on the latent tensor, for the iteration. In some conventional approaches, as discussed above, each iteration includes use of a higher (second) resolution block 102 and a lower (first) resolution block 112. In some aspects of the present disclosure, some iterations 101 may use an adapter block 115 to generate the latent tensor, rather than the lower resolution block 112.

In the illustrated example, as discussed below in more detail, the feature tensor generated by the block 105B is used as the input to the block 105A of the higher resolution block 102 during the subsequent iteration 101B. Although depicted as discrete components for conceptual clarity, in some aspects, the iterations 101 may be implemented by processing the generated data using all or a subset of the same hardware and/or software components. For example, the same higher resolution block 102 may be used in each iteration 101, processing a new input feature tensor each time (e.g., during a given iteration, the higher resolution block 102 may process the feature tensor generated during the immediately prior iteration in order to generate a new feature tensor for the immediately subsequent iteration).

Specifically, as illustrated the iteration 101A uses a higher resolution block 102 and a lower resolution block 112 to generate output features, and the iteration 101B uses the (same) higher resolution block 102 with the adapter block 115 to generate output features. As illustrated, each iteration 101 may generally process data at multiple different scales through one or more downsampling and upsampling operations. This may be referred to as a U-Net architecture in some aspects.

Specifically, block 105A of the higher resolution block 102 receives an input tensor (e.g., features from a prior iteration, or input data to the model) for the iteration. In some aspects, the input tensor may be referred to as $x_t$. In some aspects, the higher resolution block 102 operates at full resolution (also referred to as a second resolution). That is, the higher resolution block 102 may operate on the input data in the same or original size or dimensionality of the data, while the lower resolution block 112 operates on smaller or lower resolution (first resolution) data. The higher resolution block 102 is generally used to compute $x_{t-1}$. In some aspects, the higher resolution block 102 computes the next tensor according to $x_{t-1}=f_h(x_t, z_{t-1})$, where $f_h$ indicates application of the higher resolution block 102, $x_t$ is the input to the higher resolution block 102 during iteration t, and $z_{t-1}$ is a denoised latent tensor generated by the lower resolution block (or adapter) for iteration t, as discussed in more detail below.

The block 105A performs some computation or transformation (e.g., convolution, self-attention, and the like) and provides the resulting tensor to a downsampling operation 107A. The downsampling operation 107A generally reduces the size or dimensionality of the tensor (e.g., reducing the spatial size of the features) using any suitable downsampling technique(s). As illustrated, the output of the block 105A is also provided, via skip connection 106A, to the block 105B of the higher resolution block 102. This skip connection

106A may be implemented using a variety of operations, such as an identity mapping, convolution operations, and the like. The skip connection 106A may improve model stability in some aspects.

As illustrated, the output of the downsampling operation 107A is provided to a first block 110A in the lower resolution block 112. In some aspects, the lower resolution block 112 is used to compute the denoised latent tensor $z_{t-1}$ for iteration t based on the latent tensor $z_t$ generated by the higher resolution block 102 (e.g., output by the block 105A and/or the downsampling operation 107A) during the iteration t. In some aspects, the lower resolution block 112 computes the denoised latent tensor according to $z_{t-1}=f_l(z_t)$, where $f_l$ indicates application of the lower resolution block 112 and $z_t$ is the output from the block 105A during iteration t.

The lower resolution block 112 generally includes a variety of operations (indicated by exemplary blocks 110A-G) that may perform various operations such as convolution, attention, and the like. In the illustrated example, the lower resolution block 112 includes evaluation at multiple scales as well. Specifically, the input embedding (from the block 105A) is processed by the block 110A, which generates output for the block 110B. The output of the block 110B is then downsampled by the downsampling operation 107B and provided to the block 110C. In some aspects, the lower resolution block 112 may further include a skip connection 106B between the block 110B and the block 110F. The output of the block 110C is processed by the block 110D, which generates data input to the block 110E.

The output of the block 110E is then upsampled by the upsampling operation 109A and provided as input to the block 110F. The output of the block 110F is used as input to the block 110G, and the output of the block 110G is then upsampled via the upsampling operation 109B and used as input to the block 105B of the higher resolution block 102. The block 105B then processes this input (along with the output of the block 105A via the skip connection 106A, in some aspects) to generate an output feature tensor, which acts as the output for the iteration 101A.

In some aspects, the data generated by the block 105A and/or by the downsampling operation 107A may be referred to as an embedding (generated by the higher resolution block 102) and/or as a noisy latent tensor. That is, the output that is provided, from the higher resolution block 102 to the lower resolution block 112, may be referred to as an embedding or noisy latent tensor. The output generated by the block 110G may similarly be referred to as a denoised latent tensor. That is, the lower resolution block 112 generates an incrementally denoised latent tensor based on the received noisy tensor.

In the illustrated example, the second iteration 101B does not use the lower resolution block 112. Instead, the adapter block 115 is used to generate the denoised latent tensor for the iteration 101B. Specifically, as illustrated, the feature tensor (generated during the iteration 101A) is used as input to the higher resolution block 102 (e.g., to the block 105A) to generate output, which is downsampled via the downsampling operation 107A, and provided as input to the adapter block 115. In the illustrated example, the adapter block 115 further receives, as input, the denoised latent tensor generated by the block 110G during the first iteration 101A. Based on these inputs, the adapter block 115 generates a new denoised latent tensor for the second iteration 101B, which is then upsampled via the upsampling operation 109B and provided as input to the block 105B of the higher resolution block 102.

As discussed above, the adapter block 115 may generally be implemented in such a way as to use fewer computational resources and/or to incur reduced latency, as compared to the lower resolution block 112. In this way, the iteration 101B can be performed substantially more quickly and with reduced computational expense, as compared to the iteration 101A.

Generally, the particular operations or configuration of the adapter block 115 may vary depending on the particular implementation. For example, in some aspects, the adapter block 115 implements or comprises an identity mapping that copies the latent tensor generated during the iteration 101A (e.g., the denoised tensor from the block 110G) to the next iteration 101B. In some aspects, this computationally effective use of an identity mapping can produce acceptable outputs in some domains, particularly when the number of sampling steps (e.g., the number of iterations) is sufficiently high.

In some aspects, the adapter block 115 is parametric. That is, the adapter block 115 may use a set of learned parameters (with values learned during training) to generate the latent tensor for the iteration 101B. In some aspects, this may result in a more effective approximation, resulting in improved outputs with reduced expense (and, in some cases, a reduced number of iterations).

In some aspects, the adapter block 115 is defined as a convolutional U-Net with two scale representations. In some aspects, to ensure its computational efficiency, the adapter block 115 may exclude self-attention and cross-attention operations. In some aspects, rather than U-Net architectures, the adapter block 115 may comprise other operations, such as an isotropic stack of convolutions. In some aspects, as discussed in more detail below, the adapter block 115 may use an encoder-decoder architecture.

Although two iterations 101 are depicted for conceptual clarity, in some aspects, any number of iterations may be used to process data using the diffusion model. Further, although the illustrated example depicts data being evaluated at three resolutions in the iteration 101A, any number of resolutions (e.g., any number of downsampling and upsampling operations) may be used. Similarly, the particular arrangement and configuration of the blocks 105 in the higher resolution block 102 and the blocks 110 in the lower resolution block 112 are presented merely for conceptual clarity. The actual arrangement and configuration of the blocks 105 and the blocks 110 may vary depending on the particular implementation.

Additionally, though not depicted in the illustrated example, in some aspects, some or all of the blocks 105 in the higher resolution block 102 and/or some or all of the blocks 110 in the lower resolution block 112 may further receive, as input, additional data such as an embedding of the original prompt into the model (e.g., a text embedding of the string that was provided as input or prompt to the model to generate an image).

Similarly, the adapter block 115 may or may not receive input from the upsampling operation 107A. The adapter block 115 may or may not receive additional input such as the text embedding of the input string, a time embedding indicating which iteration is being performed, and the like. For example, to make the adapter block 115 conditional to the diffusion step or iteration t, the adapter block 115 may receive, as input, a time step or iteration embedding indicating which iteration is being performed (e.g., for which iteration is the denoised latent tensor being generated).

Example Efficient Model Architectures for Generative Machine Learning

Figure 2A:
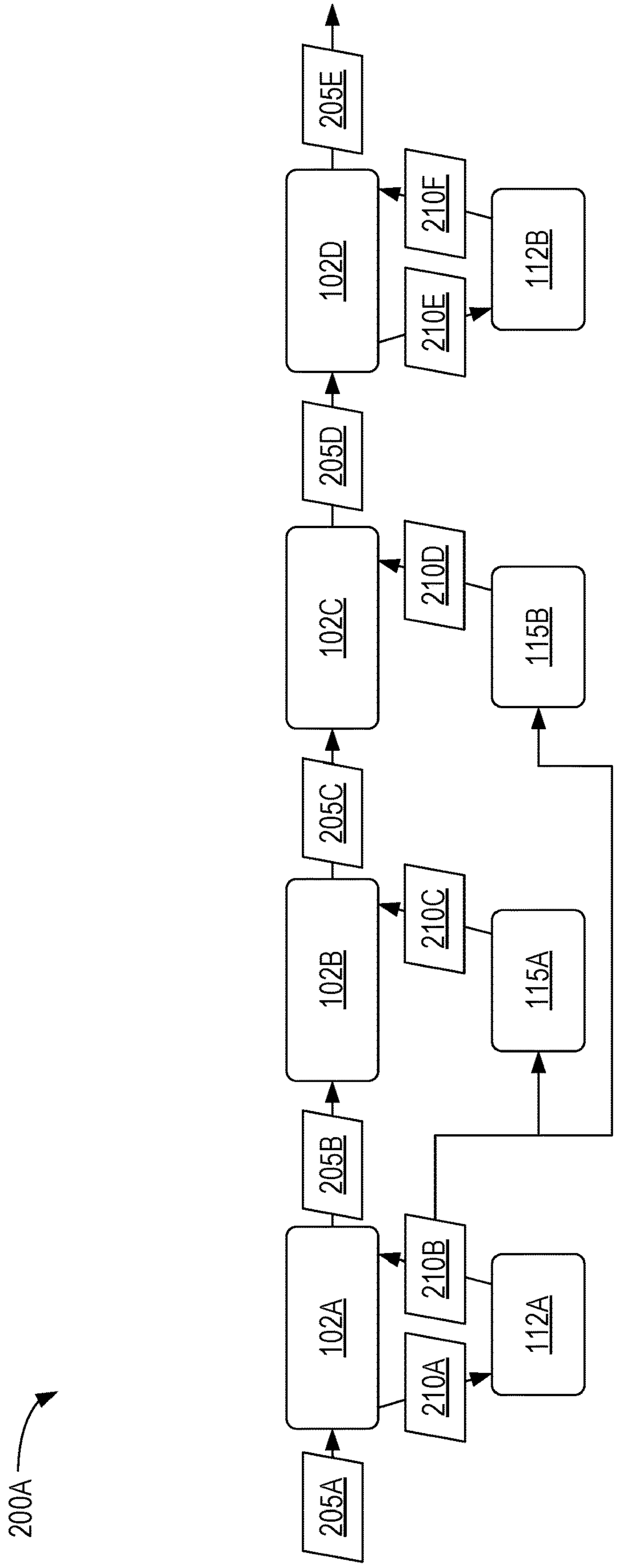
FIGS. 2A, 2B, and 2C depict example efficient model architectures for generative machine learning, according to some aspects of the present disclosure.
Figure 2B:
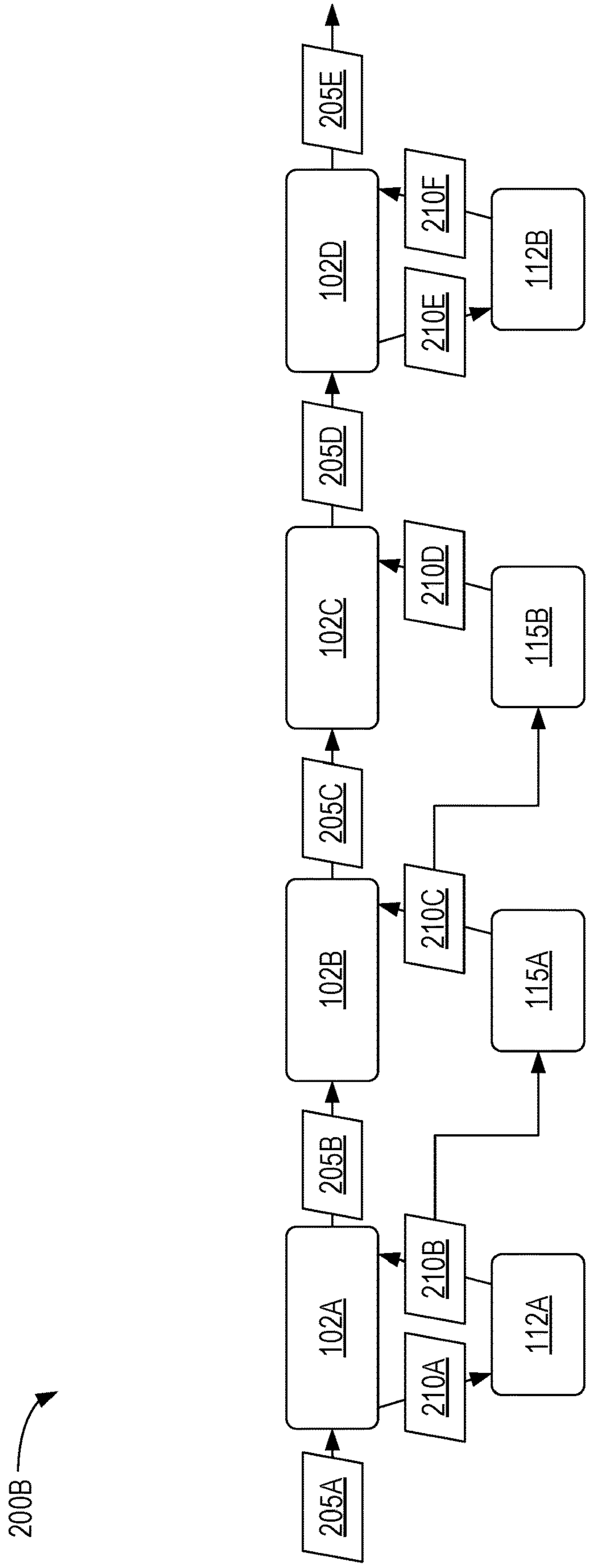
Figure 2C:
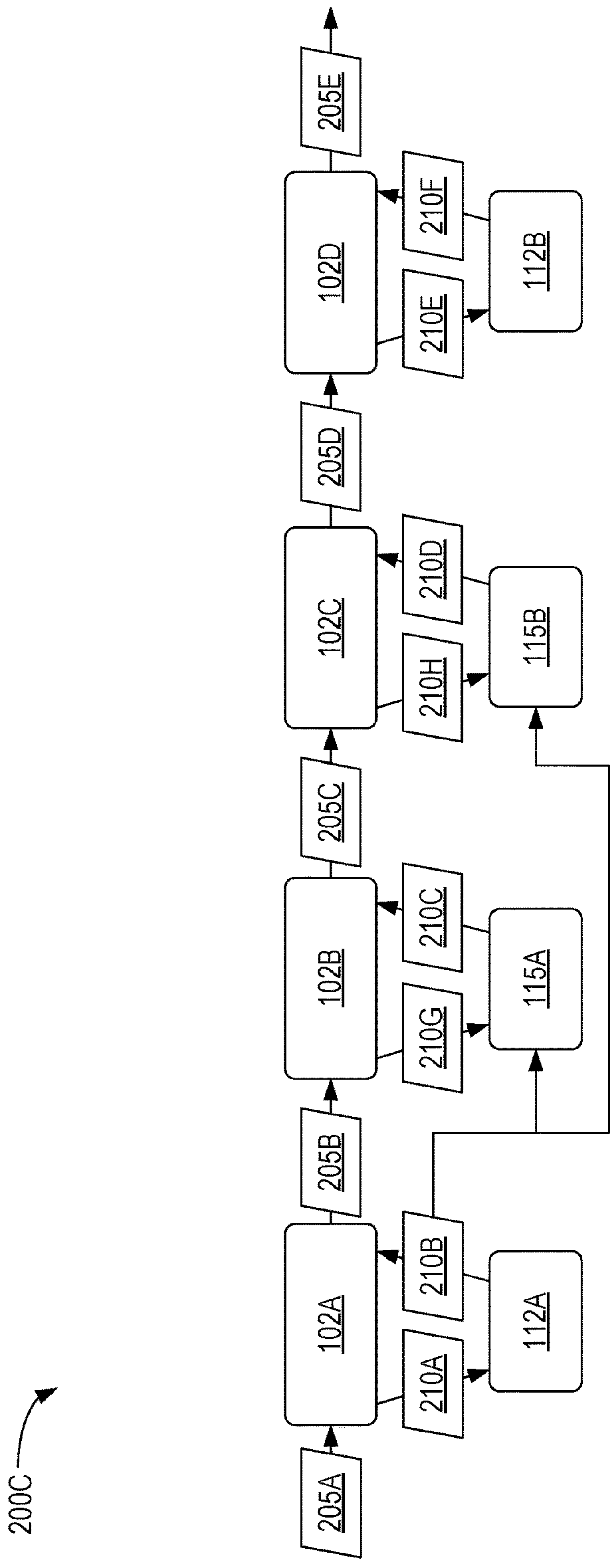

FIGS. 2A, 2B, and 2C depict example efficient model architectures 200A, 200B, and 200C, respectively, for generative machine learning, according to some aspects of the present disclosure. In some aspects, FIGS. 2A, 2B, and 2C depict operations of an example denoising backbone of a diffusion model. In some aspects, the architectures 200A, 200B, and 200C are used by a machine learning system, such as a computing system that trains and/or uses diffusion models during inferencing (e.g., the machine learning system discussed above with reference to FIG. 1).

Specifically, the architecture 200A depicts a feedforward adapter architecture, the architecture 200B depicts a recurrent adapter architecture, and the architecture 200C uses a multi-input feedforward adapter architecture. Each of the architectures 200A, 200B, and 200C includes four iterations of processing data using a diffusion machine learning model, but any number of iterations may also be used. As discussed above, rather than using the lower resolution block in all iterations (which may be relatively expensive and slow), an adapter block can be used in at least some of the iterations.

As depicted in FIG. 2A, the feedforward adapter architecture 200A generally involves mapping the latent tensor from one iteration (e.g., the first iteration) to one or more subsequent iterations using adapter blocks. Specifically, in the illustrated example, an input feature tensor 205A (e.g., a feature tensor from a prior layer in the diffusion model, and/or an embedding of the actual textual input to the model) is processed by at least a portion of a higher resolution block 102A (which may correspond to the higher resolution block 102 of FIG. 1), which generates a latent tensor 210A (also referred to in some aspects as a noisy latent tensor), as discussed above. For example, the latent tensor 210A may be generated by the block 105A of FIG. 1.

As illustrated, the latent tensor 210A is processed by a lower resolution block 112A (which may correspond to the lower resolution block 112 of FIG. 1) in order to generate a latent tensor 210B (also referred to in some aspects as a denoised latent tensor, as discussed above). For example, the latent tensor 210B may be generated by the block 110G of FIG. 1. As illustrated, the latent tensor 210B is then processed by the higher resolution block 102A to generate a feature tensor 205B. For example, the feature tensor 205B may be generated by the block 105B of FIG. 1. As discussed above, the feature tensor 205B is used as the output tensor for the iteration, and the feature tensor 205B is used as the input feature tensor for the subsequent iteration.

Specifically, as illustrated, the feature tensor 205B is used as input to the higher resolution block 102B (which may correspond to the iteration 101B of FIG. 1). Although depicted as discrete higher resolution blocks 102A and 102B for conceptual clarity, in some aspects, the higher resolution blocks 102A and 102B may be implemented by processing data using a single higher resolution block 102 at different times (e.g., processing the feature tensor 205A using the higher resolution block 102 at a first time, and then processing the resulting output feature tensor 205B using the same higher resolution block 102 at a subsequent time). In other aspects, the higher resolution block 102A may be different from the higher resolution block 102B.

In the illustrated example, the latent tensor 210B, generated during the first iteration, is also provided as input to adapter block 115A (e.g., 115 in FIG. 1). During the second iteration, the adapter block 115A generates a latent tensor 210C (also referred to as a denoised latent tensor, as discussed above). This latent tensor 210C is then provided as input to the higher resolution block 102B during the second iteration. Of note, in the illustrated architecture 200A, the adapter block 115A does not receive input from the higher resolution block 102B. That is, the feature tensor 205B generated during the prior iteration may be used by the higher resolution block 102B to generate the feature tensor 205C, but the feature tensor 205B is not accessed or used by the adapter block 115A to generate the new latent tensor 210C. Thus, for example, returning to FIG. 1, the connection from the block 105A and the adapter block 115 may be severed or may not exist.

As illustrated, the higher resolution block 102B processes the input feature tensor 205B and the latent tensor 210C to generate a new feature tensor 205C during the second iteration.

In the architecture 200A, the feature tensor 205C is then used as input to the higher resolution block 102C during the subsequent (third) iteration. Although depicted as a discrete higher resolution block 102C for conceptual clarity, as discussed above, the higher resolution block 102C may be the same as the higher resolution blocks 102A and 102B, such as by processing data using a single higher resolution block 102 at a subsequent time (e.g., after the feature tensor 205B is processed to generate the feature tensor 205C). In other aspects, the higher resolution block 102C may be different from one or more of the higher resolution blocks 102A and 102B.

In the illustrated example, the latent tensor 210B, generated during the first iteration, is also provided as input to the adapter block 115B. During the third iteration, the adapter block 115B generates a latent tensor 210D (also referred to as a denoised latent tensor, as discussed above). This latent tensor 210D is then provided as input to the higher resolution block 102C during the third iteration.

Although depicted as discrete adapter blocks 115A and 115B for conceptual clarity, in some aspects, the adapter blocks 115A and 115B may be implemented by processing data using a single adapter block 115 at different times (e.g., processing the latent tensor 210B using the adapter block 115 at a first time to generate the latent tensor 210C, and then processing the latent tensor 210B using the same adapter block 115 at a subsequent time to generate the latent tensor 210D). In other aspects, the adapter blocks 115A and 115B may be different from one another.

As illustrated, the higher resolution block 102C processes the input feature tensor 205C and the latent tensor 210D to generate a new feature tensor 205D during the third iteration.

In the architecture 200A, the feature tensor 205D is then used as input to the higher resolution block 102D during the subsequent (fourth) iteration. Although depicted as a discrete higher resolution block 102D for conceptual clarity, as discussed above, the higher resolution block 102D may be the same as the higher resolution blocks 102A, 102B, and 102C, such as by processing data using a single higher resolution block 102 at a subsequent time. In other aspects, the higher resolution block 102D may be different from one or more of the higher resolution blocks 102A, 102B, and 102C.

In the illustrated example, rather than using the adapter block in the fourth iteration, the lower resolution block 112B is used to process the latent tensor 210E (generated by the higher resolution block 102D) to generate the latent tensor 210F. The latent tensor 210F is then used by the higher resolution block 102D (in conjunction with the feature tensor 205D) to generate the feature tensor 205E. Although depicted as discrete lower resolution blocks 112A and 112B for conceptual clarity, in some aspects, the lower resolution blocks 112A and 112B may be implemented by processing data using a single lower resolution block 112 at different times. In other aspects, the lower resolution blocks 112A and 112B may be different blocks.

In the illustrated example, the architecture 200A uses the lower resolution block 112 for one iteration, then uses the adapter block 115 for two iterations, and then uses the lower resolution block 112 again for the fourth iteration. Thus, in this example, the first and last iterations use lower resolution blocks. In other examples, any combination or order of lower resolution blocks and adapters may be used.

In some aspects, the number of iterations or steps that can be performed using the adapter block 115 (rather than the lower resolution block 112) may be a configurable hyperparameter or a learnable parameter. For example, a user may configure the model to use the lower resolution block 112 for the first iteration, followed by every other iteration thereafter, every third iteration thereafter, every fourth iteration thereafter, and the like. Although four iterations of processing data using the denoising backbone are depicted for conceptual clarity, in aspects, the architecture may use any number of iterations to generate output.

Although not depicted in the illustrated example, in some aspects, the adapter block 115 may receive further input (in addition to the latent tensor 210 from a prior iteration). For example, in some aspects, the adapter block 115 receives a time embedding indicating which iteration is being performed. As another example, the adapter block 115 may receive a text embedding (e.g., a Contrastive Language-Image Pretraining (CLIP) embedding) representing the string that was provided as input to the diffusion model.

Although not depicted in the illustrated example, in some aspects, there may be one or more components of the diffusion model used prior to and/or subsequent to the depicted denoising backbone. For example, input text may undergo various processing prior to being provided to the higher resolution block 102 during the first iteration. In some aspects, the input to the initial iteration of the denoising backbone is a random tensor (e.g., a white noise image) and the text prompt may be used as additional input to guide the denoising. Similarly, the output feature tensor 205 of the final iteration of the backbone may be processed using one or more downstream components (e.g., a decoder) to generate the final output of the model (e.g., a generated image).

Advantageously, the feedforward architecture 200A (where the latent tensor 210B from the first iteration is reused at multiple future iterations) prevents error accumulation. That is, because the adapter block 115 approximates the latent tensor in a given iteration, repeatedly applying the adapter to a previously approximated latent tensor may allow any introduced errors to accumulate through iterations (which may result in more frequent applications of the lower resolution block 112 instead of the adapter block 115 to reduce such error). By using the depicted feedforward architecture, however, such errors do not accumulate.

Turning to FIG. 2B, the architecture 200B depicts a recurrent adapter architecture. As depicted in FIG. 2B, the recurrent adapter architecture 200B largely mirrors the feedforward adapter architecture 200A of FIG. 2A and generally involves mapping the latent tensor from one iteration (e.g., the first iteration) to the immediately subsequent iteration using the adapter block. Specifically, in the illustrated example, the input feature tensor 205A is processed by at least a portion of the higher resolution block 102A to generate the latent tensor 210A, and the latent tensor 210A is processed by the lower resolution block 112A to generate the latent tensor 210B.

As illustrated, the latent tensor 210B is then processed by the higher resolution block 102A to generate the feature tensor 205B, which is used as input to the higher resolution block 102B. Although depicted as discrete higher resolution blocks 102A and 102B for conceptual clarity, in some aspects, the higher resolution blocks 102A and 102B may be implemented by processing data using a single higher resolution block 102 at different times (e.g., processing the feature tensor 205A using the higher resolution block 102 at a first time, and then processing the resulting output feature tensor 205B using the same higher resolution block 102 at a subsequent time). In other aspects, the higher resolution block 102A may be different from the higher resolution block 102B.

In the illustrated example, the latent tensor 210B, generated during the first iteration, is also provided as input to the adapter block 115A, as discussed above. During the second iteration, the adapter block 115A generates the latent tensor 210C, which is then provided as input to the higher resolution block 102B during the second iteration. As illustrated, the higher resolution block 102B processes the input feature tensor 205B and the latent tensor 210C to generate a new feature tensor 205C during the second iteration. In the architecture 200B, the feature tensor 205C is then used as input to the higher resolution block 102C during the subsequent (third) iteration.

In the illustrated example, rather than providing the latent tensor 210B (generated during the first iteration) as input to the adapter block 115B, the latent tensor 210C (generated during the second iteration) is used by the adapter block 115B in the third iteration. In some aspects, if the fourth iteration also used an adapter (instead of the lower resolution block), the latent tensor 210D generated during the third iteration would be used in the fourth iteration to generate the new latent tensor.

During the third iteration, the adapter block 115B generates the latent tensor 210D based on the latent tensor 210C. This latent tensor 210D is then provided as input to the higher resolution block 102C during the third iteration. As illustrated, the higher resolution block 102C processes the input feature tensor 205C and the latent tensor 210D to generate the new feature tensor 205D during the third iteration. The feature tensor 205D is used as input to the higher resolution block 102D during the subsequent (fourth) iteration to generate the latent tensor 210E, and the lower resolution block 112B is used to process the latent tensor 210E to generate the latent tensor 210F. The latent tensor 210F is then used by the higher resolution block 102D (in conjunction with the feature tensor 205D) to generate the feature tensor 205E.

In the illustrated example, the architecture 200B uses the lower resolution block 112 for one iteration, then uses the adapter block 115 for two iterations, and then uses the lower resolution block 112 again for the fourth iteration. In some aspects, the number of iterations or steps that can be performed using the adapter block 115 (rather than the lower resolution block 112) may be a configurable hyperparameter or a learnable parameter. For example, a data scientist may configure the model to use the lower resolution block 112 for the first iteration, followed by every other iteration thereafter, every third iteration thereafter, every fourth iteration thereafter, and the like. Although four iterations of processing data using the denoising backbone are depicted for conceptual clarity, in aspects, the architecture may use any number of iterations to generate output. Thus, in this example, the first and last iterations use lower resolution blocks. In other examples, any combination or order of lower resolution blocks and adapters may be used.

Although not depicted in the illustrated example, in some aspects, the adapter block 115 may receive further input (in addition the latent tensor 210 from a prior iteration), as discussed above. For example, in some aspects, the adapter block 115 receives a time embedding indicating which iteration is being performed. As another example, the adapter block 115 may receive a text embedding (e.g., a CLIP embedding) representing the prompt string that was provided as input to the diffusion model.

Although not depicted in the illustrated example, in some aspects, there may be one or more components of the diffusion model used prior to and/or subsequent to the depicted denoising backbone. For example, input text may undergo various processing prior to being provided to the higher resolution block 102 (along with the white noise input) during the first iteration. Similarly, the output feature tensor 205 of the final iteration of the backbone may be processed using one or more downstream components to generate the final output of the model (e.g., a generated image).

Advantageously, the recurrent architecture 200B (where the latent tensor 210B from a given iteration may be reused in the immediately subsequent iteration, but not in further iterations beyond the subsequent iteration) may improve flexibility of the model. For example, while the feedforward architecture 200A discussed above may be limited to consistently use the same adapter interleave settings (e.g., always skipping the lower resolution block for the same number of iterations), the recurrent architecture 200B may allow the model (or users) to dynamically determine how many steps or iterations to perform before switching back to the lower resolution block.

Turning to FIG. 2C, the architecture 200C depicts a multi-input feedforward adapter architecture. As depicted in FIG. 2C, the multi-input feedforward adapter architecture 200C largely mirrors the feedforward adapter architecture 200A of FIG. 2A, and generally involves mapping the latent tensor from one iteration (e.g., the first iteration) to one or more subsequent iterations using adapter blocks. Specifically, in the illustrated example, the input feature tensor 205A is processed by at least a portion of the higher resolution block 102A, which generates the latent tensor 210A, as discussed above. As illustrated, the latent tensor 210A is processed by a lower resolution block 112A to generate the latent tensor 210B, which is then processed by the higher resolution block 102A to generate the feature tensor 205B.

The feature tensor 205B is used as input to the higher resolution block 102B (e.g., the same higher resolution block during a subsequent iteration). In the illustrated example, the latent tensor 210B, generated during the first iteration, is also provided as input to the adapter block 115A. During the second iteration, the adapter block 115A generates a latent tensor 210D. In the illustrated architecture 200B, rather than evaluating only the latent tensor 210B as input, the adapter block 115A also receives and evaluates an embedding generated by the higher resolution block 102B during the second iteration. That is, the latent tensor 210G (referred to in some aspects as an embedding) is also received as input by the adapter block 115A.

Using the latent tensors 210B and 210G, the adapter block 115A generates the latent tensor 210C (e.g., a denoised latent tensor), which is then provided as input to the higher resolution block 102B during the second iteration. As illustrated, the higher resolution block 102B processes the input feature tensor 205B and the latent tensor 210C to generate the new feature tensor 205C during the second iteration.

In the architecture 200C, the feature tensor 205C is then used as input to the higher resolution block 102C during the subsequent (third) iteration. Using the feature tensor 205C, the higher resolution block 102C generates a latent tensor 210H, which is provided as input to the adapter block 115B. In the illustrated example, the latent tensor 210B, generated during the first iteration, is also provided as input to the adapter block 115B.

During the third iteration, the adapter block 115B generates the latent tensor 210D based on the latent tensor 210B and the latent tensor 210H and provides the latent tensor 210D to the higher resolution block 102C during the third iteration. The higher resolution block 102C processes the input feature tensor 205C and the latent tensor 210D to generate the new feature tensor 205D during the third iteration. The feature tensor 205D is then used as input to the higher resolution block 102D during the subsequent (fourth) iteration.

In the illustrated example, rather than using the adapter block in the fourth iteration, the lower resolution block 112B is used to process the latent tensor 210E (generated by the higher resolution block 102D) to generate the latent tensor 210F. The latent tensor 210F is then used by the higher resolution block 102D (in conjunction with the feature tensor 205D) to generate the feature tensor 205E.

In the illustrated example, the architecture 200C uses the lower resolution block 112 for one iteration, then uses the adapter block 115 for two iterations, and then uses the lower resolution block 112 again for the fourth iteration. In some aspects, the number of iterations or steps that can be performed using the adapter block 115 (rather than the lower resolution block 112) may be a configurable hyperparameter or a learnable parameter. For example, a data scientist may configure the model to use the lower resolution block 112 for the first iteration, followed by every other iteration thereafter, every third iteration thereafter, every fourth iteration thereafter, and the like. Although four iterations of processing data using the denoising backbone are depicted for conceptual clarity, in aspects, the architecture may use any number of iterations to generate output. Thus, in this example, the first and last iterations use lower resolution blocks. In other examples, any combination or order of lower resolution blocks and adapters may be used.

Although not depicted in the illustrated example, in some aspects, the adapter block 115 may receive further input (in addition to the latent tensor 210 from a prior iteration and the latent tensor 210 from the higher resolution block 102 in the same iteration). For example, in some aspects, the adapter block 115 receives a time embedding indicating which iteration is being performed. As another example, the adapter block 115 may receive a text embedding (e.g., a CLIP embedding) representing the string that was provided as input to the diffusion model.

Although not depicted in the illustrated example, in some aspects, there may be one or more components of the diffusion model used prior to and/or subsequent to the depicted denoising backbone. For example, input text may undergo various processing prior to being provided to the higher resolution block 102 (along with the white noise image) during the first iteration. Similarly, the output feature tensor 205 of the final iteration of the backbone may be processed using one or more downstream components to generate the final output of the model (e.g., a generated image).

Advantageously, the multi-input feedforward architecture 200C (where the latent tensor 210B from the first iteration is reused at multiple future iterations) prevents error accumulation, as discussed above. Further, in some aspects, the addition of the feedback from the higher resolution path (e.g., the latent tensors 210C and 210E from the higher resolution block 102) may provide a form of error correction to the generated denoised latents. This error correction can improve the accuracy of the resulting feature tensors in some aspects. In this way, the architecture 200C may be able to generate improved output images and/or comparable output images using fewer iterations (and therefore, fewer computational resources and reduced latency) in some aspects.

Figure 3:
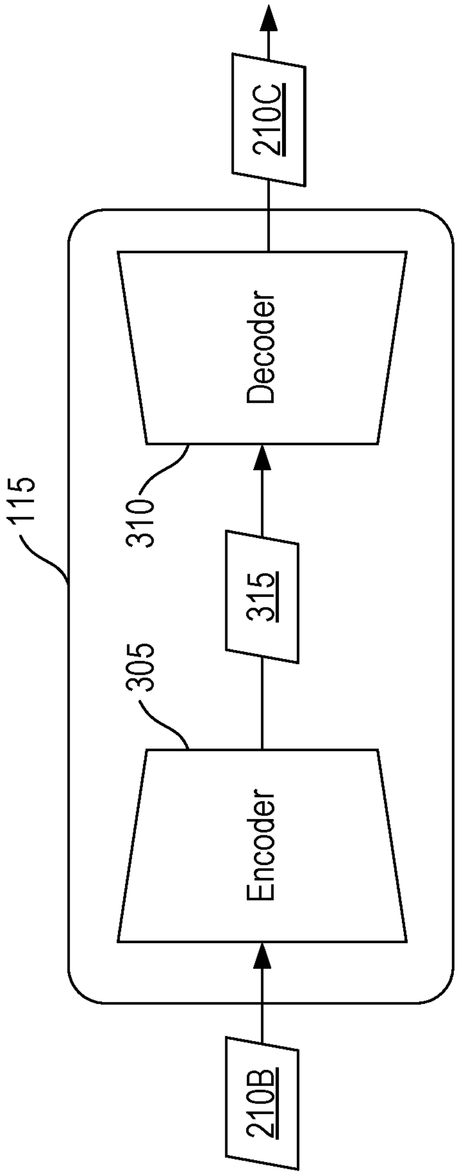
FIG. 3 depicts an example architecture for an encoder-decoder adapter block in efficient model architectures for generative machine learning, according to some aspects of the present disclosure.

Example Architecture for an Encoder-Decoder Adapter Block for Generative Machine Learning Models FIG. 3 depicts an example architecture for an encoder-decoder adapter block for generative machine learning models, according to some aspects of the present disclosure. In some aspects, the depicted architecture is used by a machine learning system, such as a computing system that trains and/or uses diffusion models during inferencing (e.g., the machine learning system discussed above with reference to FIGS. 1, 2A, 2B, and/or 2C).

As discussed above, by reusing denoised latent tensors generated in one iteration for one or more subsequent iterations, the diffusion model may use more efficient adapter blocks for at least a subset of the iterations of the denoising backbone (using the more expensive lower resolution block for one or more of the iterations). However, while this practice reduces the computational complexity and latency of the denoising backbone, in some aspects, storing these latent tensors (e.g., in memory) for future use introduces some amount of increased memory overhead to the inferencing process.

In some aspects, to reduce this overhead, the depicted encoder-decoder adapter block 115 architecture may be used. In the illustrated example, rather than using the adapter block 115 during a given iteration (e.g., to generate a denoised latent tensor for the given iteration), the operations of the adapter block 115 may be divided across iterations. Specifically, in the illustrated example, the adapter block 115 includes an encoder block 305, which may be used during one iteration, and a decoder block 310, which may be used during the subsequent iteration, as discussed in more detail below.

In some aspects, the encoder block 305 generally corresponds to a parameterized component (e.g., one or more layers of a neural network) trained to generate a compressed or reduced version of an input tensor, while the decoder block 310 similarly corresponds to a parameterized component (e.g., one or more layers of a neural network) trained to reconstruct or hallucinate the original input based on the compressed data. In some aspects, the encoder-decoder architecture may be referred to as a bottleneck.

In the illustrated example, an input latent tensor, such as the latent tensor 210B (e.g., a denoised latent tensor generated by an adapter or by a lower resolution block during a given iteration), in addition to being used by the higher resolution block to generate an output feature, is also provided as input to the encoder block 305. The encoder block 305 processes or transforms the latent tensor 210B to generate a compressed tensor 315. As discussed above, the compressed tensor 315 may generally correspond to a compressed version of the latent tensor 210B. For example, the compressed tensor 315 may have a smaller size or memory footprint (such as through dimensionality reduction of the latent tensor 210B).

In some aspects, rather than transferring the latent tensor 210B itself (e.g., rather than storing the latent tensor 210B in memory until the next iteration), the compressed tensor 315 is stored. This reduces the memory footprint of the operation. During the next iteration, the compressed tensor 315 may be retrieved from memory and processed using the decoder block 310 to generate a latent tensor, such as the latent tensor 210C.

In some aspects, the latent tensor 210C approximates the latent tensor 210B. That is, the encoder block 305 and/or decoder block 310 may be trained to attempt to align the output of the decoder block 310 (the latent tensor 210C) with the input to the encoder block 305 (the latent tensor 210B). In some aspects, therefore, the adapter may use or add one or more additional components to adapt the original denoised latent tensor from the first iteration to a new denoised latent tensor in the second iteration. For example, the output of the decoder block 310 may be processed by another adapter component (e.g., the adapter block 115A of FIG. 2A, discussed above) to generate a new denoised latent tensor.

In some aspects, rather than training the encoder block 305 and the decoder block 310 to preserve the latent tensor 210B, the encoder block 305 and/or decoder block 310 may be trained to perform this adaptation internally. For example, the output of the decoder block 310 may itself be a new denoised latent tensor 210C for the current iteration (e.g., an adapted version of the denoised latent tensor 210B from the earlier iteration).

In this way, by maintaining the compressed tensor 315 between iterations (rather than the entire latent tensor 210B), the memory footprint of the adapter block 115 between iterations can be substantially reduced, further improving the computational efficiency of the diffusion model (particularly in memory-constrained environments)

Example Architecture for Training Efficient Generative Machine Learning Models

Figure 4:
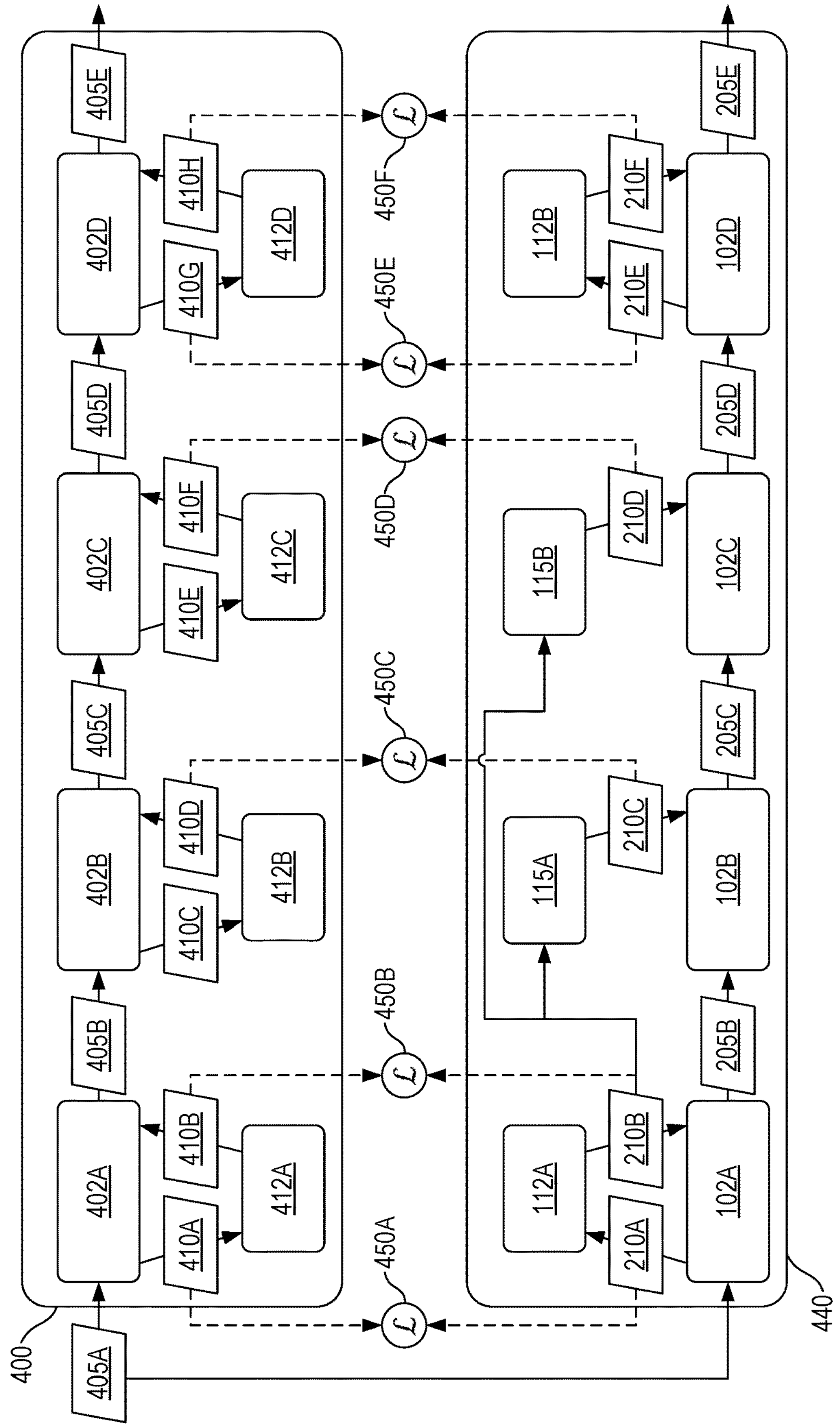
FIG. 4 depicts an example architecture for training efficient generative machine learning models, according to some aspects of the present disclosure.

FIG. 4 depicts an example architecture for training efficient generative machine learning models, according to some aspects of the present disclosure. In some aspects, the depicted workflow can be used to train the denoising backbone of a diffusion model, such as the higher resolution block 102, lower resolution block 112, and/or adapter block 115 discussed above with reference to FIGS. 1, 2A, 2B, 2C, and/or 3. In some aspects, the depicted training workflow is performed by a machine learning system, such as a computing system that trains and/or uses diffusion models during inferencing (e.g., the machine learning system discussed above with reference to FIGS. 1, 2A, 2B, 2C, and/or 3).

In the illustrated example, a student model 440 corresponding to the efficient denoising backbone is trained based on a teacher model 400 that uses a conventional lower resolution block 412 to generate denoised latent tensors at each iteration (while the student model 440 uses a more efficient adapter block 115 for at least some iterations, as discussed above). Although the illustrated example depicts a sequence of blocks (e.g., multiple higher resolution blocks 402A, 402B, and so on), in some aspects, as discussed above, the sequence of blocks may be implemented by performing operations using the same block at different times. For example, the higher resolution block 402A may correspond to processing a first set of data (e.g., an input 405A) using a given set of weights at a first time, and the higher resolution block 402B may correspond to processing a second set of data (e.g., a feature tensor 405B) using the same given set of weights at a different time.

As illustrated, the input 405A is provided to a higher resolution block 402A of the teacher model 400, as well as to a higher resolution block 102A of the student model 440. The higher resolution block 402A processes the input 405A to generate a latent tensor 410A, and the higher resolution block 102A processes the input 405A to generate a latent tensor 210A. In the illustrated example, the latent tensors 410A and 210A are then processed by lower resolution blocks 412A and 112A, respectively, to generate the denoised latent tensors 410B and 210B, respectively.

The latent tensors 410B and 210B are then processed by (at least part of) the higher resolution blocks 402A and 102A, respectively, to generate feature tensors 405B and 205B, respectively. As illustrated, the feature tensors 405B and 205B are used as input to the higher resolution blocks 402B and 102B, respectively. In the teacher model 400, the higher resolution block 402B generates a latent tensor 410C based on the feature tensor 405B. This latent tensor 410C is then provided as input to the lower resolution block 412B, which generates a denoised latent tensor 410D. In the student model 440, the latent tensor 210B (generated by the lower resolution block 112A during the prior iteration) is provided to an adapter block 115A, which generates a denoised latent tensor 210C.

As illustrated, the denoised latent tensors 410D and 210C are then processed by the higher resolution blocks 402B and 102B, respectively, to generate feature tensors 405C and 205C, respectively. The feature tensors 405C and 205C are used as input to the higher resolution blocks 402C and 102C, respectively. In the teacher model 400, the higher resolution block 402C generates a latent tensor 410E based on the feature tensor 405C. This latent tensor 410E is then provided as input to the lower resolution block 412C, which generates a denoised latent tensor 410F. In the student model 440, the latent tensor 210B (generated by the lower resolution block 112A during the prior iteration) is provided to an adapter block 115B, which generates a denoised latent tensor 210D.

The denoised latent tensors 410F and 210D are then processed by the higher resolution block 402C and 102C, respectively, to generate feature tensors 405D and 205D, respectively. The feature tensors 405D and 205D are used as input to the higher resolution blocks 402D and 102D, respectively. In the illustrated example, the higher resolution blocks 402D and 102D output latent tensors 410G and 210E, respectively. The latent tensors 410G and 210E are then processed by lower resolution blocks 412D and 112B, respectively, to generate denoised latent tensors 410H and 210F, respectively.

The latent tensors 410H and 210F are then processed by (at least part of) the higher resolution blocks 402D and 102D, respectively, to generate feature tensors 405E and 205E, respectively. As discussed above, this process may repeat for any number of iterations to compute the backbone of the diffusion models.

In the illustrated example, to train the student model 440, the latent tensors 210 (e.g., 210A-210F) generated by the student model 440 are compared against the corresponding latent tensors 410 generated by the teacher model 400. Specifically, in the illustrated example, the latent tensor 210A generated by the higher resolution block 102A (e.g., the latent tensor generated during the first iteration of processing data, based on the input 405A) is compared against the latent tensor 410A generated by the higher resolution block 402A of the teacher model 400 in the same iteration (e.g., generated based on the input 405A). This is depicted by loss component 450A.

Similarly, the latent tensor 210B (generated by the lower resolution block 112A in the first iteration) is compared against the latent tensor 410B (generated by the lower resolution block 412A in the first iteration) to generate loss component 450B. Additionally, the latent tensor 210C (generated by the adapter block 115A in the second iteration) is compared against the latent tensor 410D (generated by the lower resolution block 412B in the second iteration) to generate loss component 450C. The latent tensor 210D (generated by the adapter block 115B in the third iteration) is compared against the latent tensor 410F (generated by the lower resolution block 412C in the third iteration) to generate loss component 450D. Further, the latent tensor 210E (generated by the higher resolution block 102D in the fourth iteration) is compared against the latent tensor 410G (generated by the higher resolution block 402D in the fourth iteration) to generate loss component 450E, and the latent tensor 210F (generated by the lower resolution block 112B in the fourth iteration) is compared against the latent tensor 410H (generated by the lower resolution block 412D in the fourth iteration) to generate loss component 450F.

In some aspects, the parameters of the student model 440 are updated to minimize, or at least reduce, the cumulative loss components 450A-450F. For example, the loss for the student model 440 may be defined as the reconstruction error, such as by using Equation 1 below, where $\mathcal{L}$ is the loss, T is the number of iterations (e.g., the number of times the denoising backbone is used to process the data), $z_t$ is a latent tensor 410 generated by the teacher model 400 during iteration t, and $\hat{z}_t$ is a latent tensor 210 generated by the student model 440 during iteration t.

$$\mathcal{L}=\sum_{t=0}^{T}\|z_t-\hat{z}_t\|_2 \tag{1}$$

In some aspects, the student model 440 may be trained via backward distillation (e.g., using text inputs only, without corresponding target images), and/or via forward distillation (e.g., using text inputs and corresponding target images).

Generally, the depicted architecture can be used to refine the student model 440 based on any number of inputs 405 (e.g., the process may be repeated any number of times). Further, in some aspects, the student model 440 may be updated based on each individual input 405 (e.g., using stochastic gradient descent) or based on batches of inputs 405 (e.g., using batch gradient descent). Using the depicted architecture, the teacher model 400 (which uses the computationally expensive lower resolution block 412 in every iteration) may be used to effectively train the student model 440 (which uses a more computationally efficient adapter block 115 for at least some iterations). In this way, the student model 440 learns to generate accurate outputs effectively.

Example Method for Training Generative Machine Learning Models

Figure 5:
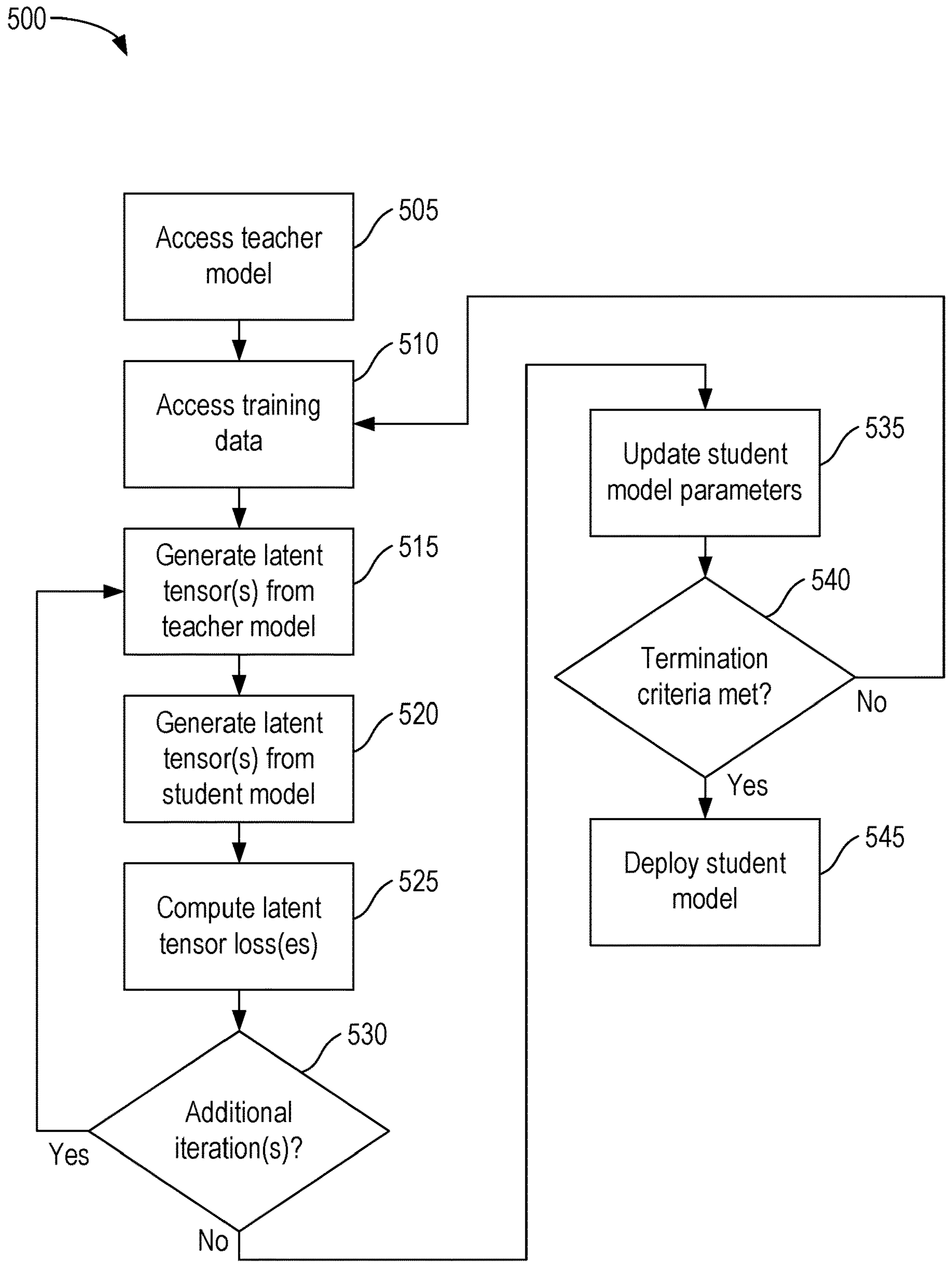
FIG. 5 is a flow diagram depicting an example method for training generative machine learning models, according to some aspects of the present disclosure.

FIG. 5 is a flow diagram depicting an example method 500 for training generative machine learning models, according to some aspects of the present disclosure. In some aspects, the method 500 is performed by a machine learning system, such as a computing system that trains and/or uses diffusion models during inferencing (e.g., the machine learning system discussed above with reference to FIGS. 1, 2A, 2B, 2C, 3, and/or 4).

At block 505, the machine learning system accesses a teacher model. As used herein, "accessing" data may generally include receiving, retrieving, requesting, collecting, generating, measuring, obtaining, or otherwise gaining access to the data. For example, the machine learning system may access a pretrained diffusion model, such as the teacher model 400 of FIG. 4. In some aspects, as discussed above, the teacher model generally corresponds to a generative model that uses a denoising backbone (e.g., a set of denoising operation(s) that are applied iteratively and/or sequentially on data in order to generate model output), where the denoising backbone includes use of a lower resolution block (e.g., the lower resolution blocks 412 of FIG. 4) during each such iteration.

At block 510, the machine learning system accesses training data to be used to train an efficient diffusion model. In some aspects, as discussed above, the training data may comprise a textual prompt (to be used as input) and a corresponding target image (to be used as target output), such as if a forward distillation approach is being used. In some aspects, as discussed above, the training data may comprise only a textual prompt (with no image data), such as if a backwards distillation is being used. Generally, the machine learning system may access the training data in any order (including randomly or pseudo-randomly).

At block 515, the machine learning system generates one or more latent tensors by processing the training data using the teacher model. For example, as discussed above with reference to FIG. 4, the machine learning system may generate latent tensors 410 using the higher resolution block 402 and/or the lower resolution block 412. In some aspects, at block 515, the machine learning system generates the latent tensor(s) during a single iteration of the denoising backbone of the teacher model.

At block 520, the machine learning system generates one or more latent tensors by processing the training data using a student model (e.g., the student model 440 of FIG. 4). For example, as discussed above with reference to FIG. 4, the machine learning system may generate latent tensors 210 using the higher resolution block 102, the lower resolution block 112, and/or the adapter block 115. In some aspects, at block 520, the machine learning system generates the latent tensor(s) during a single iteration of the denoising backbone of the student model.

At block 525, the machine learning system computes or otherwise determines one or more latent tensor losses (e.g., using reconstruction error) between the latent tensor(s) generated by the teacher model and the latent tensor(s) generated by the student model. For example, the machine learning system may use Equation 1 above to generate the loss. In some aspects, the number of loss components generated for a given iteration of processing data using the backbones may vary depending on the particular implementation and architecture. For example, in some aspects, the machine learning system may generate two losses (e.g., one for the latent tensor generated by the higher resolution block, and one for the latent tensor generated by the lower resolution block and/or the adapter block) for each iteration.

At block 530, the machine learning system determines whether there is at least one iteration remaining for the denoising backbone. That is, the machine learning system determines whether the backbone should be used to process the feature tensor at least one more time. In some aspects, as discussed above, the number of iterations used may be defined by a user. If at least one iteration remains, the method 500 returns to block 515, where the machine learning system generates a new set of latent tensors by processing the output of the prior iteration (e.g., the feature tensor generated during the last iteration) using the teacher model. The machine learning system similarly processes the prior output of the student model at block 520 to generate a new set of latent tensors.

Returning to block 530, if the machine learning system determines that no additional iterations remain, the method 500 continues to block 535. At block 535, the machine learning system updates one or more parameters of the student model based on the generated losses, as discussed above. In this way, the student model learns to generate effective and accurate outputs using an adapter block for at least some of the iterations, as compared to using the more complex lower resolution block.

At block 540, the machine learning system determines whether one or more termination criteria are met. Generally, the termination criteria may correspond to a wide variety of factors depending on the particular implementation. For example, in some aspects, the machine learning system may determine whether additional training data is available, whether the student model has reached a preferred or desired accuracy, whether training is still progressing or has stalled, whether a defined number of iterations, amount of computational resource, and/or amount of time have been used training the model, and the like.

If, at block 540, the machine learning system determines that the termination criteria are not met, the method 500 returns to block 510. If the termination criteria are met, the method 500 continues to block 545, where the machine learning system deploys the student model for inferencing. Generally, deploying the student model may include a wide variety of operations, and generally corresponds to any steps taken to prepare or provide the model for runtime use. For example, the machine learning system may instantiate or use the model locally, may transmit the trained student model to one or more inferencing systems, and the like.

Although the illustrated example depicts training of the denoising backbone of a student model, in some aspects, there may be one or more components of the diffusion model used prior to and/or subsequent to the denoising backbone. For example, input text may undergo various processing prior to being provided to the backbone during the first iteration. Similarly, the output feature tensor of the final iteration of the backbone may be processed using one or more downstream components to generate the final output of the model (e.g., a generated image). In some aspects, such other components may also be trained based on the teacher model, and/or the student model may use pre-trained parameters (e.g., from the teacher model) for these other components.

Example Method for Inferencing Using Generative Machine Learning Models

Figure 6:
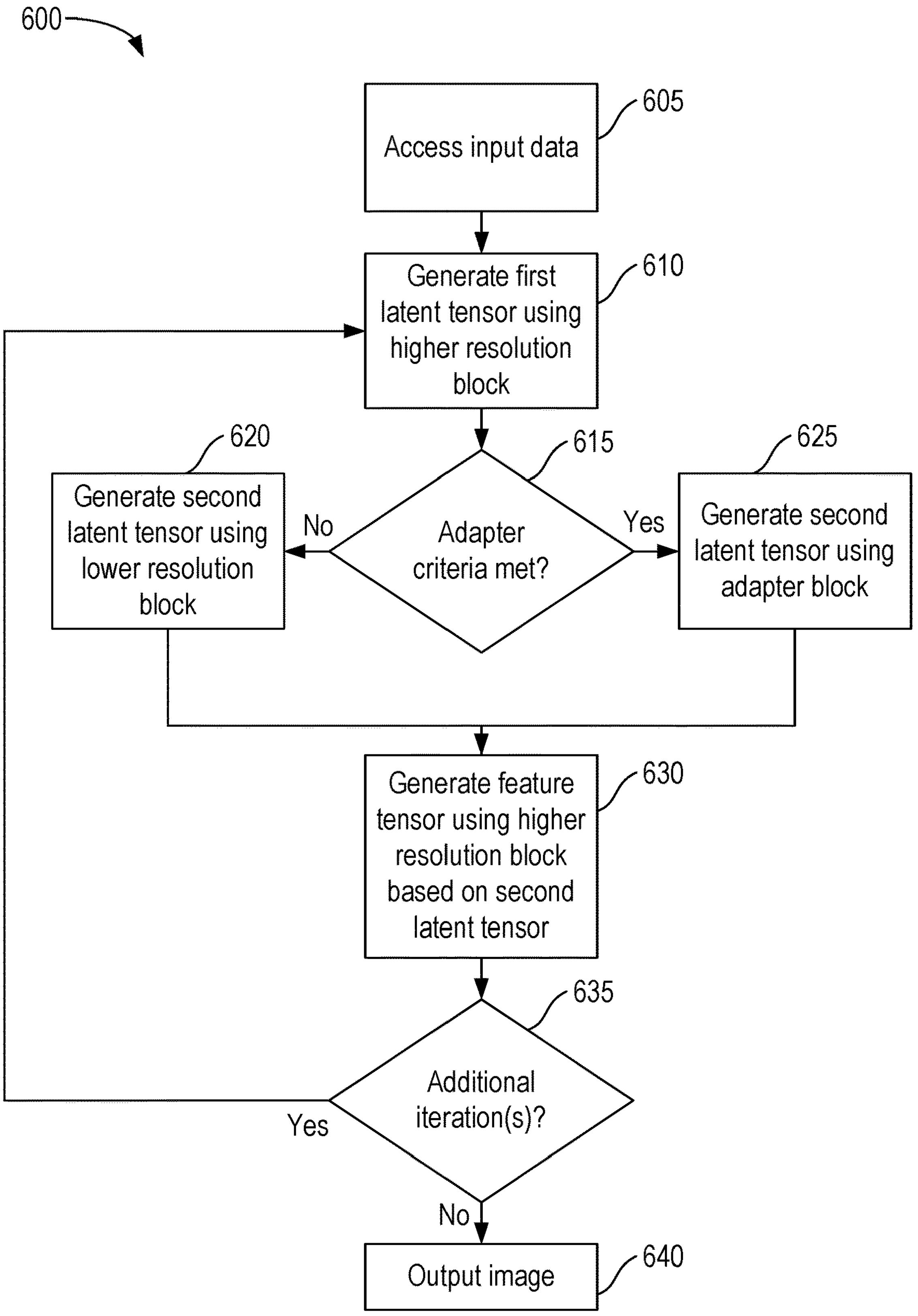
FIG. 6 is a flow diagram depicting an example method for inferencing using generative machine learning models, according to some aspects of the present disclosure.

FIG. 6 is a flow diagram depicting an example method 600 for inferencing using generative machine learning models, according to some aspects of the present disclosure. In some aspects, the method 600 is performed by a machine learning system, such as a computing system that trains and/or uses diffusion models during inferencing (e.g., the machine learning system discussed above with reference to FIGS. 1, 2A, 2B, 2C, 3, 4, and/or 5).

At block 605, the machine learning system accesses input data during runtime. For example, as discussed above, the input data may comprise textual data (e.g., natural language text) to be used to generate an image. In some aspects, the input may further include other elements, such as image data (e.g., where the text input indicates how to modify or edit the provided image). In some aspects, the input to the denoising backbone may be a white noise image in the first iteration (and a progressively denoised image in subsequent iterations), along with the prompt text (or an embedding of the prompt).

At block 610, the machine learning system generates a first denoised latent tensor, based on the input data, using a higher resolution block of a denoising backbone of the diffusion machine learning model. Although not depicted in the illustrated example, in some aspects, the model may include other processing prior to the denoising backbone (e.g., to generate an embedding based on the textual input). This processed data may then be used as input to the higher resolution block during the first iteration of processing data using the denoising backbone.

At block 615, the machine learning system determines whether one or more adapter criteria are met. In some aspects, the adapter criteria generally indicate whether a computationally expensive lower resolution block should be used during the current iteration of processing data using the backbone, or whether a more efficient adapter block should be used. In some aspects, the criteria include evaluating a predefined architecture or configuration (e.g., specifying to use the lower resolution block every N iterations, and the adapter block for the remaining iterations).

If, at block 615, the machine learning system determines that the adapter criteria are not met, the method 600 continues to block 620, where the machine learning system generates a second latent tensor for the iteration using the lower resolution block of the backbone (e.g., by processing the latent tensor generated at block 610 using the lower resolution block). In some aspects, as discussed above, the machine learning system may further process other data to generate the second latent tensor. For example, data such as the embedding of the input data may also be used as input to the lower resolution block. The method 600 then continues to block 630.

Returning to block 615, if the machine learning system determines that the adapter criteria are met, the method 600 continues to block 625, where the machine learning system generates a second latent tensor using the adapter block. For example, in some aspects, the machine learning system processes a prior latent tensor (generated by the lower resolution block or the adapter block during a prior iteration) to generate the new latent tensor for the current iteration. In some aspects, as discussed above, the machine learning system may further process other data to generate the second latent tensor. For example, data such as the embedding of the input data, an embedding indicating which iteration or time step is currently being processed, the latent tensor generated at block 610, and the like may also be used as input to the adapter block. The method 600 then continues to block 630.

At block 630, the machine learning system generates a feature tensor for the current iteration by processing the second latent tensor (generated by the lower resolution block at block 620 or generated by the adapter block at block 625) using the higher resolution block, as discussed above.

At block 635, the machine learning system determines whether there is at least one iteration remaining for the denoising backbone. That is, the machine learning system determines whether the backbone should be used to process the feature tensor at least one more time. In some aspects, as discussed above, the number of iterations used may be defined by the architecture or configuration of the model (e.g., indicating to perform eight iterations). In some aspects, the machine learning system determines whether to use another iteration based on the quality of the generated feature tensor (e.g., by evaluating the newly generated feature tensor using one or more quality techniques or metrics, and exiting the backbone if the quality is sufficiently high).

If at least one iteration remains, the method 600 returns to block 610, where the machine learning system generates a new latent tensor by processing the output of the prior iteration (e.g., the feature tensor generated at block 630) using the higher resolution block of the backbone.

Returning to block 635, if the machine learning system determines that no additional iterations remain, the method 600 continues to block 640. At block 640, the machine learning system generates and outputs an image, as output from the diffusion machine learning model, based on the feature tensor(s) generated at block 630. For example, the feature tensor generated during the final iteration of the backbone may be provided to one or more additional layers or components of the diffusion model (e.g., a decoder, one or more fully connected layers, attention layers, non-linear layers, and the like) to generate the image. In some aspects, as this final feature tensor was itself generated based in part on the prior feature tensors, the output image may therefore be referred to as being generated based (at least in part) on each of the feature tensors generated by the denoising backbone.

Example Method for Processing Data Using a Diffusion Machine Learning Model

Figure 7:
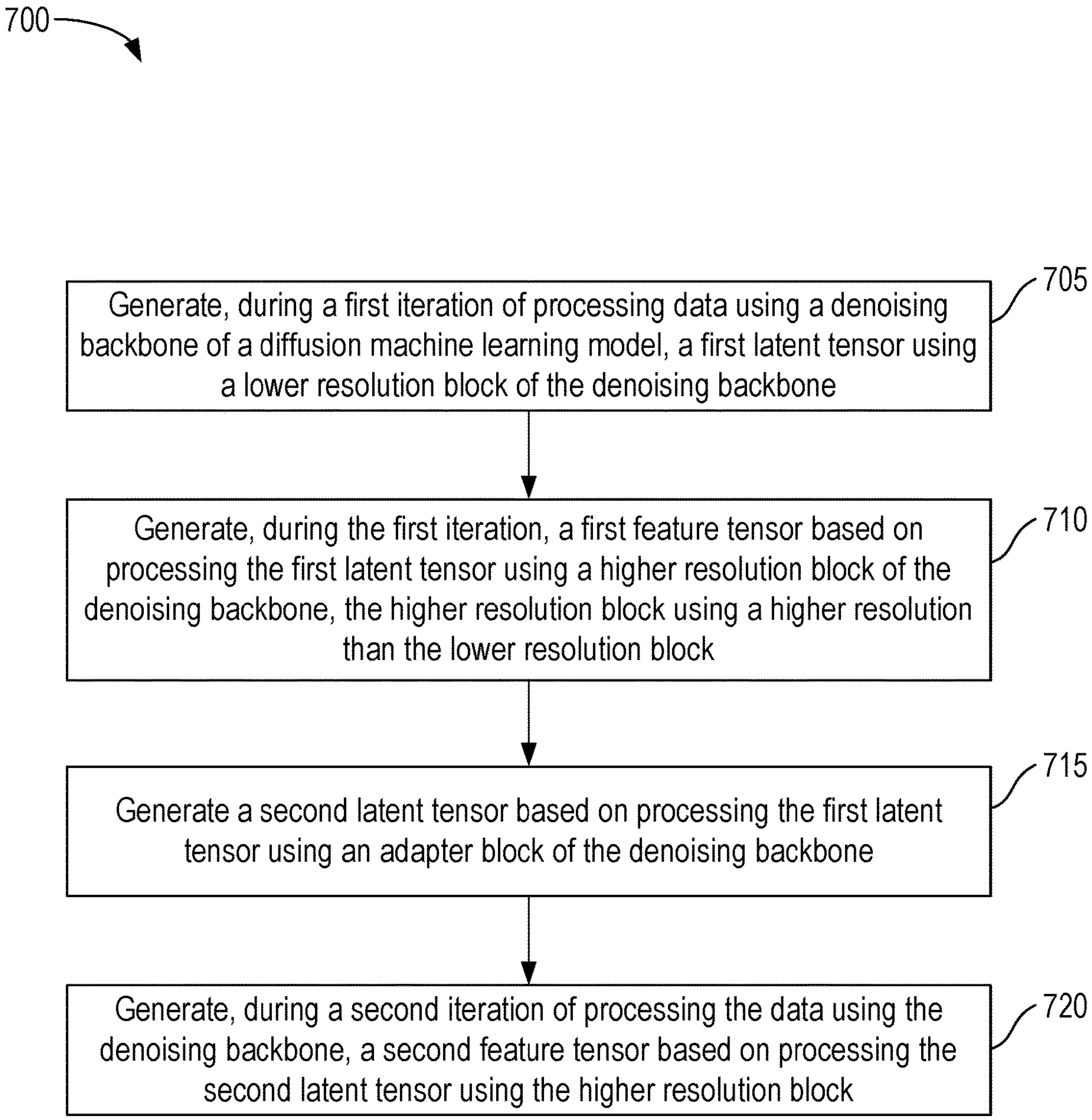
FIG. 7 is a flow diagram depicting an example method for processing data using a diffusion machine learning model, according to some aspects of the present disclosure.

FIG. 7 is a flow diagram depicting an example method 700 for processing data using a diffusion machine learning model, according to some aspects of the present disclosure. In some aspects, the method 700 is performed by a machine learning system, such as a computing system that trains and/or uses diffusion models during inferencing (e.g., the machine learning system discussed above with reference to FIGS. 1, 2A, 2B, 2C, 3, 4, 5, and/or 6).

At block 705, during a first iteration of processing data using a denoising backbone of a diffusion machine learning model, a first latent tensor is generated using a lower resolution block of the denoising backbone.

At block 710, during the first iteration, a first feature tensor is generated based on processing the first latent tensor using a higher resolution block of the denoising backbone, the higher resolution block using a higher resolution than the lower resolution block.

At block 715, a second latent tensor is generated based on processing the first latent tensor using an adapter block of the denoising backbone.

In some aspects, generating the second latent tensor is performed based further on processing an embedding corresponding to the second iteration using the adapter block. In some aspects, generating the second latent tensor is performed based further on processing an embedding corresponding to an input to the diffusion machine learning model using the adapter block. In some aspects, generating the second latent tensor is performed based further on processing an embedding generated, by the higher resolution block, using the adapter block. In some aspects, the adapter block performs an identity mapping.

In some aspects, the adapter block uses a set of learned parameters to generate the second latent tensor based on the first latent tensor. In some aspects, the adapter block performs one or more convolution operations to generate the second latent tensor. In some aspects, the adapter block comprises an encoder and a decoder, and generating the second latent tensor comprises: generating a compressed tensor based on processing the first latent tensor using the encoder, and generating the second latent tensor based on processing the compressed tensor using the decoder.

In some aspects, generating the first latent tensor using the lower resolution block generates a first amount of latency, generating the second latent tensor using the adapter block generates a second amount of latency, and the second amount of latency is less than the first amount of latency.

In some aspects, the second latent tensor is not generated based on the first feature tensor.

At block 720, during a second iteration of processing the data using the denoising backbone, a second feature tensor is generated based on processing the second latent tensor using the higher resolution block.

In some aspects, the method 700 further includes generating a third latent tensor based on processing the first latent tensor using the adapter block. In some aspects, the method 700 further includes generating, during a third iteration of processing the data using the diffusion machine learning model, a third feature tensor based on processing the third latent tensor using the higher resolution block.

In some aspects, the method 700 further includes generating a third latent tensor based on processing the second latent tensor using the adapter block. In some aspects, the method 700 further includes generating, during a third iteration of processing the data using the diffusion machine learning model, a third feature tensor based on processing the third latent tensor using the higher resolution block.

In some aspects, the method 700 further includes generating, during a third iteration of processing the data using the diffusion machine learning model, a third latent tensor using the lower resolution block. In some aspects, the method 700 further includes generating, during the third iteration, a third feature tensor based on processing the third latent tensor using the higher resolution block.

In some aspects, the diffusion machine learning model was trained using distillation from a teacher machine learning model, and the teacher machine learning model uses a plurality of higher resolution blocks and a corresponding plurality of lower resolution blocks.

In some aspects, the method 700 further includes generating an image based at least in part on the first and second feature tensors, and outputting the image as output from the diffusion machine learning model.

Example Method for Training a Diffusion Machine Learning Model

Figure 8:
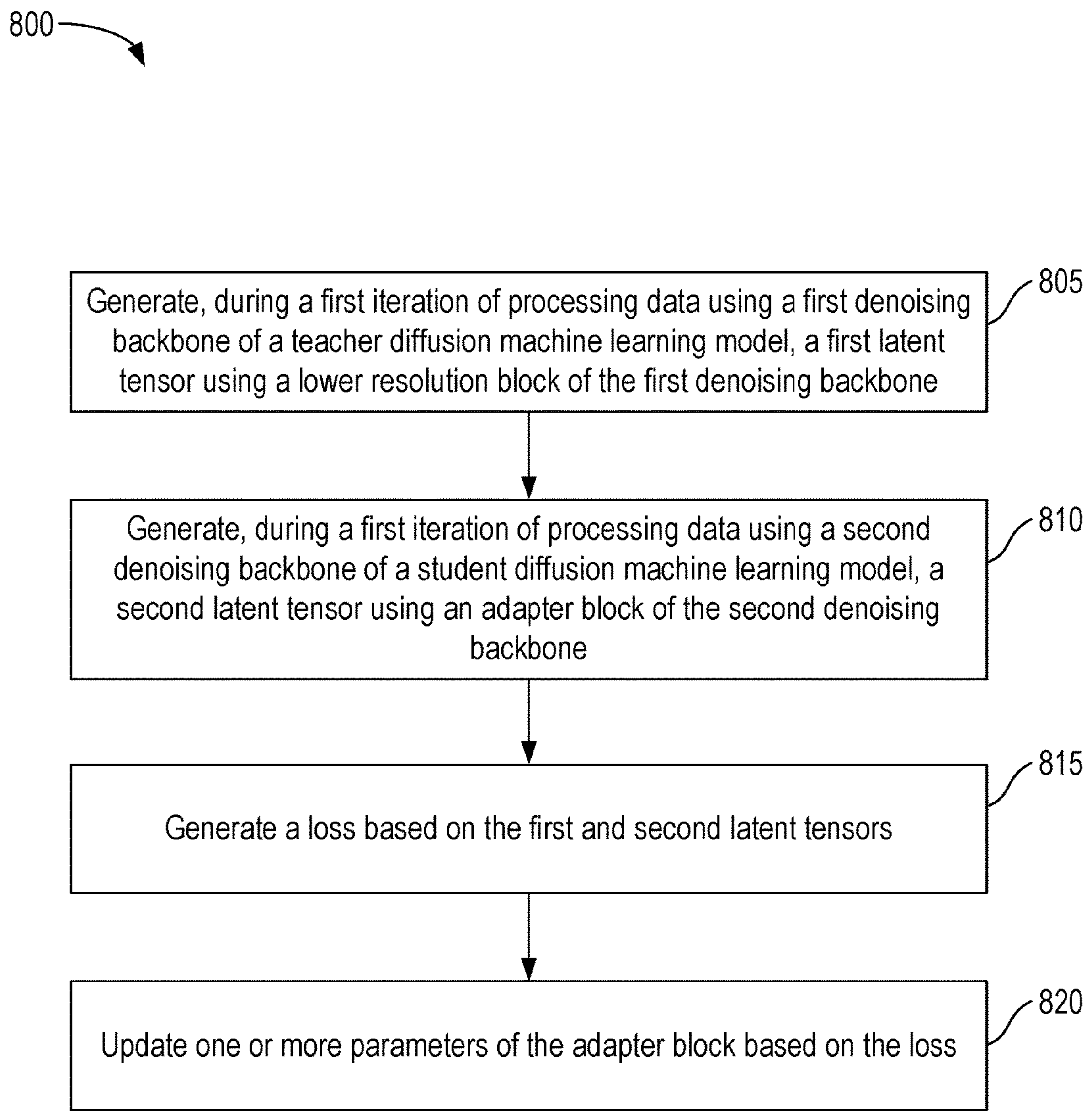
FIG. 8 is a flow diagram depicting an example method for training diffusion machine learning models, according to some aspects of the present disclosure.

FIG. 8 is a flow diagram depicting an example method 800 for training a diffusion machine learning model, according to some aspects of the present disclosure. In some aspects, the method 800 is performed by a machine learning system, such as a computing system that trains and/or uses diffusion models during inferencing (e.g., the machine learning system discussed above with reference to FIGS. 1, 2A, 2B, 2C, 3, 4, 5, 6, and/or 7).

At block 805, during a first iteration of processing data using a first denoising backbone of a teacher diffusion machine learning model, a first latent tensor is generated using a lower resolution block of the first denoising backbone.

At block 810, during a first iteration of processing data using a second denoising backbone of a student diffusion machine learning model, a second latent tensor is generated using an adapter block of the second denoising backbone.

In some aspects, generating the second latent tensor is performed based further on processing an embedding corresponding to the first iteration using the adapter block.

In some aspects, generating the second latent tensor is performed based further on processing an embedding corresponding to an input to the student diffusion machine learning model using the adapter block.

In some aspects, generating the second latent tensor is performed based further on processing an embedding, generated by a higher resolution block of the second denoising backbone, using the adapter block.

In some aspects, the adapter block performs one or more convolution operations to generate the second latent tensor.

In some aspects, the adapter block comprises an encoder and a decoder, and generating the second latent tensor comprises: generating a compressed tensor based on processing a third latent tensor using the encoder, and generating the second latent tensor based on processing the compressed tensor using the decoder.

At block 815, a loss is generated based on the first and second latent tensors.

At block 820, one or more parameters of the adapter block are updated based on the loss.

In some aspects, the method 800 further includes updating one or more parameters of a higher resolution block of the second denoising backbone based on the loss; and updating one or more parameters of a lower resolution block of the second denoising backbone based on the loss.

In some aspects, the method 800 further includes generating a third latent tensor based on processing the second latent tensor using the adapter block; and generating, during a second iteration of processing the data using the student diffusion machine learning model, a feature tensor based on processing the third latent tensor using a higher resolution block of the second denoising backbone.

In some aspects, the method 800 further includes generating, during a second iteration of processing the data using the student diffusion machine learning model, a third latent tensor using a lower resolution block of the second denoising backbone; and generating, during the second iteration, a feature tensor based on processing the third latent tensor using a higher resolution block of the second denoising backbone.

Example Processing System for Machine Learning

Figure 9:
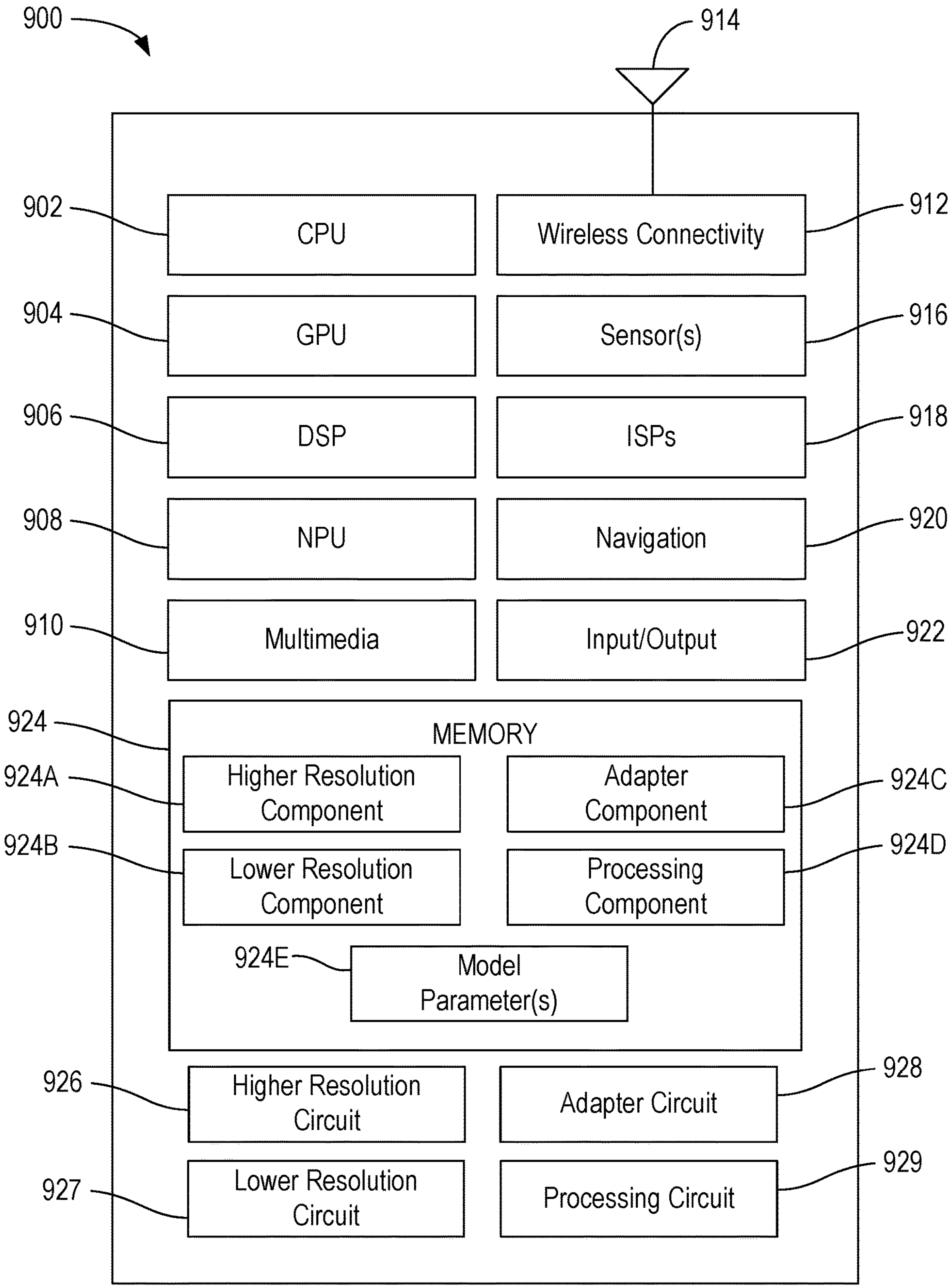
FIG. 9 depicts an example processing system configured to perform various aspects of the present disclosure.

In some aspects, the architectures, workflows, techniques, and methods described with reference to FIGS. 1-8 may be implemented on one or more devices or systems. FIG. 9 depicts an example processing system 900 configured to perform various aspects of the present disclosure, including, for example, the techniques and methods described with respect to FIGS. 1-8. In some aspects, the processing system 900 may correspond to a machine learning system, such as a computing system that trains and/or uses diffusion models during inferencing (e.g., the machine learning system discussed above with reference to FIGS. 1, 2A, 2B, 2C, 3, 4, 5, 6, 7, and/or 8). Although depicted as a single system for conceptual clarity, in some aspects, as discussed above, the operations described below with respect to the processing system 900 may be distributed across any number of devices or systems.

The processing system 900 includes a central processing unit (CPU) 902, which in some examples may be a multi-core CPU. Instructions executed at the CPU 902 may be loaded, for example, from a program memory associated with the CPU 902 or may be loaded from a memory partition (e.g., a partition of memory 924).

The processing system 900 also includes additional processing components tailored to specific functions, such as a graphics processing unit (GPU) 904, a digital signal processor (DSP) 906, a neural processing unit (NPU) 908, a multimedia component 910 (e.g., a multimedia processing unit), and a wireless connectivity component 912.

An NPU, such as NPU 908, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 908, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 908 is a part of one or more of the CPU 902, GPU 904, and/or DSP 906.

In some examples, the wireless connectivity component 912 may include subcomponents, for example, for third generation (3G) connectivity, fourth generation (4G) connectivity (e.g., Long-Term Evolution (LTE)), fifth generation (5G) connectivity (e.g., New Radio (NR)), Wi-Fi connectivity, Bluetooth connectivity, and other wireless data transmission standards. The wireless connectivity component 912 is further coupled to one or more antennas 914.

The processing system 900 may also include one or more sensor processing units 916 associated with any manner of sensor, one or more image signal processors (ISPs) 918 associated with any manner of image sensor, and/or a navigation processor 920, which may include satellite-based positioning system components (e.g., GPS or GLONASS) as well as inertial positioning system components.

The processing system 900 may also include one or more input and/or output devices 922, such as screens, touch-sensitive surfaces (including touch-sensitive displays), physical buttons, speakers, microphones, and the like.

In some examples, one or more of the processors of the processing system 900 may be based on an ARM or RISC-V instruction set.

The processing system 900 also includes memory 924, which is representative of one or more static and/or dynamic memories, such as a dynamic random access memory, a flash-based static memory, and the like. In this example, the memory 924 includes computer-executable components, which may be executed by one or more of the aforementioned processors of the processing system 900.

In particular, in this example, memory 924 includes a higher resolution component 924A, a lower resolution component 924B, an adapter component 924C, and a processing component 924D. The memory 924 further includes a set of model parameters 924E for one or more models (e.g., for a teacher model used to train the efficient diffusion model, such as the teacher model 400 of FIG. 4, and/or for an efficient diffusion model, such as the student model 440 of FIG. 4). Although not depicted in the illustrated example, the memory 924 may also include other data such as training data. Though depicted as discrete components for conceptual clarity in FIG. 9, the illustrated components (and others not depicted) may be collectively or individually implemented in various aspects.

The processing system 900 further comprises a higher resolution circuit 926, a lower resolution circuit 927, an adapter circuit 928, and a processing circuit 929. The depicted circuits, and others not depicted, may be configured to perform various aspects of the techniques described herein.

For example, the higher resolution component 924A and/or the higher resolution circuit 926 (which may correspond to the higher resolution block 102 of FIGS. 1, 2A, 2B, 2C, and/or 4, and/or the higher resolution block 402 of FIG. 4) may correspond to the higher (e.g., full) resolution portion(s) of the denoising backbone of a diffusion model. For example, the higher resolution component 924A and/or the higher resolution circuit 926 may be used to process input features in order to generate (noisy) latents as part of a denoising backbone of the diffusion model, as well as to process (denoised) latents to generate output feature data, as discussed above.

The lower resolution component 924B and/or the lower resolution circuit 927 (which may correspond to the lower resolution block 112 of FIGS. 1, 2A, 2B, 2C, and/or 4, and/or the lower resolution block 412 of FIG. 4) may correspond to the lower (e.g., reduced) resolution portion(s) of the denoising backbone of the diffusion model. For example, the lower resolution component 924B and/or the lower resolution circuit 927 may process (noisy) latent tensors generated by the higher resolution component 924A and/or higher resolution circuit 926 in order to generate (denoised) latents, as discussed above.

The adapter component 924C and/or the adapter circuit 928 (which may correspond to the adapter block 115 of FIGS. 1, 2A, 2B, 2C, 3, and/or 4, and/or the lower resolution block 412 of FIG. 4) may correspond to an adapter that can be used instead of the lower (e.g., reduced) resolution portion(s) of the denoising backbone for one or more iterations. For example, the adapter component 924C and/or the adapter circuit 928 may process (denoised) latent tensors generated during a prior iteration of the backbone, (noisy) latent tensors generated by the higher resolution component 924A and/or higher resolution circuit 927 during the current iteration, time embeddings, and/or input embeddings, in order to generate (denoised) latents for the current iteration, as discussed above.

The processing component 924D and/or the processing circuit 929 may generally be used to perform other processing (or preprocessing) involved in training and/or using the diffusion model. For example, in some aspects, the processing component 924D and/or the processing circuit 929 may generate input embeddings (e.g., CLIP embeddings) based on input data, and provide these embeddings as input to the denoising backbone. As another example, in some aspects, the processing component 924D and/or the processing circuit 929 may perform downstream processing on the features generated by the denoising backbone in order to generate model output (e.g., a synthetic image). As another example, in some aspects, the processing component 924D and/or the processing circuit 929 may generate loss components and/or update the parameters of the diffusion model during a training phase.

Though depicted as separate components and circuits for clarity in FIG. 9, the higher resolution circuit 926, lower resolution circuit 927, adapter circuit 928, and/or processing circuit 929 may collectively or individually be implemented in other processing devices of the processing system 900, such as within the CPU 902, GPU 904, DSP 906, NPU 908, and the like.

Generally, the processing system 900 and/or components thereof may be configured to perform the methods described herein.

Notably, in other aspects, elements of the processing system 900 may be omitted, such as where the processing system 900 is a server computer or the like. For example, the multimedia component 910, wireless connectivity component 912, sensor processing units 916, ISPs 918, and/or navigation processor 920 may be omitted in other aspects. Further, elements of the processing system 900 maybe distributed between multiple devices.

Example Clauses

Implementation examples are described in the following numbered clauses:

Clause 1: A method, comprising: generating, during a first iteration of processing data using a denoising backbone of a diffusion machine learning model, a first latent tensor using a lower resolution block of the denoising backbone; generating, during the first iteration, a first feature tensor based on processing the first latent tensor using a higher resolution block of the denoising backbone, the higher resolution block using a higher resolution than the lower resolution block; generating a second latent tensor based on processing the first latent tensor using an adapter block of the denoising backbone; and generating, during a second iteration of processing the data using the denoising backbone, a second feature tensor based on processing the second latent tensor using the higher resolution block.

Clause 2: A method according to Clause 1, wherein generating the second latent tensor is performed based further on processing an embedding corresponding to the second iteration using the adapter block.

Clause 3: A method according to any of Clauses 1-2, wherein generating the second latent tensor is performed based further on processing an embedding corresponding to an input to the diffusion machine learning model using the adapter block.

Clause 4: A method according to any of Clauses 1-3, wherein generating the second latent tensor is performed based further on processing an embedding generated, by the higher resolution block, using the adapter block.

Clause 5: A method according to any of Clauses 1-4, wherein the adapter block comprises an identity mapping.

Clause 6: A method according to any of Clauses 1-5, wherein the adapter block uses a set of learned parameters to generate the second latent tensor based on the first latent tensor.

Clause 7: A method according to Clause 6, wherein the adapter block performs one or more convolution operations to generate the second latent tensor.

Clause 8: A method according to any of Clauses 6-7, wherein: adapter block comprises an encoder and a decoder, and generating the second latent tensor comprises: generating a compressed tensor based on processing the first latent tensor using the encoder, and generating the second latent tensor based on processing the compressed tensor using the decoder.

Clause 9: A method according to any of Clauses 1-8, further comprising: generating a third latent tensor based on processing the first latent tensor using the adapter block; and generating, during a third iteration of processing the data using the diffusion machine learning model, a third feature tensor based on processing the third latent tensor using the higher resolution block.

Clause 10: A method according to any of Clauses 1-9, further comprising: generating a third latent tensor based on processing the second latent tensor using the adapter block; and generating, during a third iteration of processing the data using the diffusion machine learning model, a third feature tensor based on processing the third latent tensor using the higher resolution block.

Clause 11: A method according to any of Clauses 1-10, further comprising: generating, during a third iteration of processing the data using the diffusion machine learning model, a third latent tensor using the lower resolution block; and generating, during the third iteration, a third feature tensor based on processing the third latent tensor using the higher resolution block.

Clause 12: A method according to any of Clauses 1-11, wherein: the diffusion machine learning model was trained using distillation from a teacher machine learning model, and the teacher machine learning model uses a plurality of higher resolution blocks and a corresponding plurality of lower resolution blocks.

Clause 13: A method according to any of Clauses 1-12, wherein: generating the first latent tensor using the lower resolution block generates a first amount of latency, generating the second latent tensor using the adapter block generates a second amount of latency, and the second amount of latency is less than the first amount of latency.

Clause 14: A method according to any of Clauses 1-13, wherein the second latent tensor is not generated based on the first feature tensor.

Clause 15: A method according to any of Clauses 1-14, further comprising: generating an image based at least in part on the first and second feature tensors; and outputting the image as output from the diffusion machine learning model.

Clause 16: A method comprising generating, during a first iteration of processing data using a first denoising backbone of a teacher diffusion machine learning model, a first latent tensor using a lower resolution block of the first denoising backbone; generating, during a first iteration of processing data using a second denoising backbone of a student diffusion machine learning model, a second latent tensor using an adapter block of the second denoising backbone; generating a loss based on the first and second latent tensors; and updating one or more parameters of the adapter block based on the loss.

Clause 17: A method according to Clause 16, further comprising: updating one or more parameters of a higher resolution block of the second denoising backbone based on the loss; and updating one or more parameters of a lower resolution block of the second denoising backbone based on the loss.

Clause 18: A method according to any of Clauses 16-17, wherein generating the second latent tensor is performed based further on processing an embedding corresponding to the first iteration using the adapter block.

Clause 19: A method according to any of Clauses 16-18, wherein generating the second latent tensor is performed based further on processing an embedding corresponding to an input to the student diffusion machine learning model using the adapter block.

Clause 20: A method according to any of Clauses 16-19, wherein generating the second latent tensor is performed based further on processing an embedding, generated by a higher resolution block of the second denoising backbone, using the adapter block.

Clause 21: A method according to any of Clauses 16-20, wherein the adapter block performs one or more convolution operations to generate the second latent tensor.

Clause 22: A method according to any of Clauses 16-21, wherein: the adapter block comprises an encoder and a decoder, and generating the second latent tensor comprises: generating a compressed tensor based on processing a third latent tensor using the encoder, and generating the second latent tensor based on processing the compressed tensor using the decoder.

Clause 23: A method according to any of Clauses 16-22, further comprising: generating a third latent tensor based on processing the second latent tensor using the adapter block; and generating, during a second iteration of processing the data using the student diffusion machine learning model, a feature tensor based on processing the third latent tensor using a higher resolution block of the second denoising backbone.

Clause 24: A method according to any of Clauses 16-23, further comprising: generating, during a second iteration of processing the data using the student diffusion machine learning model, a third latent tensor using a lower resolution block of the second denoising backbone; and generating, during the second iteration, a feature tensor based on processing the third latent tensor using a higher resolution block of the second denoising backbone.

Clause 25: A processing system comprising: a memory comprising computer-executable instructions; and one or more processors configured to execute the computer-executable instructions and cause the processing system to perform a method in accordance with any of Clauses 1-24.

Clause 26: A processing system comprising means for performing a method in accordance with any of Clauses 1-24.

Clause 27: A non-transitory computer-readable medium comprising computer-executable instructions that, when executed by one or more processors of a processing system, cause the processing system to perform a method in accordance with any of Clauses 1-24.

Clause 28: A computer program product embodied on a computer-readable storage medium comprising code for performing a method in accordance with any of Clauses 1-24.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system, comprising:

means for generating, during a first iteration of processing data using a first denoising backbone of a teacher diffusion machine learning model, a first latent tensor using a lower resolution block of the first denoising backbone;

means for generating, during a first iteration of processing data using a second denoising backbone of a student diffusion machine learning model, a second latent tensor using an adapter block of the second denoising backbone;

means for generating a loss based on the first and second latent tensors; and means for updating one or more parameters of the adapter block based on the loss.

2. The processing system of claim 1, further comprising:

means for updating one or more parameters of a higher resolution block of the second denoising backbone based on the loss; and means for updating one or more parameters of a lower resolution block of the second denoising backbone based on the loss.

3. The processing system of claim 1, wherein generating the second latent tensor is performed based further on:

processing an embedding corresponding to the first iteration using the adapter block;

processing an embedding corresponding to an input to the student diffusion machine learning model using the adapter block; and processing an embedding, generated by a higher resolution block of the second denoising backbone, using the adapter block.

4. The processing system of claim 1, wherein generating the second latent tensor is performed based further on processing an embedding corresponding to the first iteration using the adapter block.

5. The processing system of claim 1, wherein generating the second latent tensor is performed based further on processing an embedding corresponding to an input to the student diffusion machine learning model using the adapter block.

6. The processing system of claim 1, wherein generating the second latent tensor is performed based further on processing an embedding, generated by a higher resolution block of the second denoising backbone, using the adapter block.

7. The processing system of claim 1, wherein the adapter block performs one or more convolution operations to generate the second latent tensor.

8. The processing system of claim 1, wherein:

the adapter block comprises an encoder and a decoder, and generating the second latent tensor comprises:

generating a compressed tensor based on processing a third latent tensor using the encoder, and generating the second latent tensor based on processing the compressed tensor using the decoder.

9. The processing system of claim 1, further comprising:

means for generating a third latent tensor based on processing the second latent tensor using the adapter block; and means for generating, during a second iteration of processing the data using the student diffusion machine learning model, a feature tensor based on processing the third latent tensor using a higher resolution block of the second denoising backbone.

10. The processing system of claim 1, further comprising:

means for generating, during a second iteration of processing the data using the student diffusion machine learning model, a third latent tensor using a lower resolution block of the second denoising backbone; and means for generating, during the second iteration, a feature tensor based on processing the third latent tensor using a higher resolution block of the second denoising backbone.

* * * * *